(12) United States Patent
Matsuki et al.

(10) Patent No.: US 7,310,181 B2
(45) Date of Patent: Dec. 18, 2007

(54) OPTICAL DEFLECTION DEVICE AND OPTICAL DEFLECTION METHOD THAT CONTROL OCCURRENCE OF ALIGNMENT DEFECT

(75) Inventors: Yumi Matsuki, Kanagawa (JP); Hiroyuki Sugimoto, Kanagawa (JP); Toshiaki Tokita, Kanagawa (JP); Shigeaki Nimura, Chiba (JP); Masanori Kobayashi, Kanagawa (JP); Yasuyuki Takiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/324,538

(22) Filed: Jan. 4, 2006

(65) Prior Publication Data
US 2006/0119927 A1    Jun. 8, 2006

Related U.S. Application Data

(62) Division of application No. 10/441,125, filed on May 20, 2003, now Pat. No. 7,038,835.

(30) Foreign Application Priority Data

May 28, 2002   (JP)   .............................. 2002-153978
Apr. 4, 2003   (JP)   .............................. 2003-101049

(51) Int. Cl.
*G02F 1/29*   (2006.01)
*G02F 1/23*   (2006.01)

(52) U.S. Cl. ...................... 359/315; 359/278

(58) Field of Classification Search ................ 359/315, 359/278, 320, 322, 237, 245, 252, 254
See application file for complete search history.

(56) References Cited

U.S. PATENT DOCUMENTS 6,369,793 B1 * 4/2002 Parker ........................ 345/107
(Continued)

FOREIGN PATENT DOCUMENTS

JP   5-204001   8/1993

(Continued)

OTHER PUBLICATIONS

U.S. Appl. No. 11/684,742, filed Mar. 12, 2007, Hirano et al.

*Primary Examiner*—Ricky Mack
*Assistant Examiner*—Brandi Thomas
(74) *Attorney, Agent, or Firm*—Oblon, Spivak, McClelland, Maier & Neustadt, P.C.

(57) ABSTRACT

An optical deflection device includes an optical deflection element having a pair of transparent boards arranged in a mutually opposing manner. A liquid crystal layer is filled between the boards and forms a chiral smectic C phase. An orientation film orients liquid crystal molecules in the liquid crystal layer in a substantially perpendicular direction with respect to the liquid crystal layer. Electrodes generate an electric field in a substantially parallel direction with respect to the liquid crystal layer. A first voltage application part applies, to the electrodes, an ac voltage of a deflection frequency switching the optical deflection direction of the optical deflection element. A second voltage application part applies, to the electrodes, an ac voltage of a higher frequency than the deflection frequency. A stop process part causes the second voltage application part to apply the ac voltage of the higher frequency than the deflection frequency after causing the first voltage application part to apply the ac voltage of the deflection frequency, when stopping an operation of switching the optical deflection direction of the optical deflection element.

13 Claims, 6 Drawing Sheets

U.S. PATENT DOCUMENTS

| | | | |
|---|---|---|---|
| 6,650,384 B2 * | 11/2003 | Oguchi et al. | 349/86 |
| 2002/0135729 A1 * | 9/2002 | Tokita et al. | 349/172 |
| 2006/0119927 A1 | 6/2006 | Matsuki et al. | |

FOREIGN PATENT DOCUMENTS

| | | |
|---|---|---|
| JP | 5-313116 | 11/1993 |
| JP | 6-18940 | 1/1994 |
| JP | 6-194695 | 7/1994 |
| JP | 6-222368 | 8/1994 |
| JP | 6-258646 | 9/1994 |
| JP | 6-324320 | 11/1994 |
| JP | 7-64123 | 3/1995 |
| JP | 8-262391 | 10/1996 |
| JP | 9-133904 | 5/1997 |
| JP | 9-133931 | 5/1997 |
| JP | 10-133135 | 5/1998 |
| JP | 11-109304 | 4/1999 |
| JP | 2000-507005 | 6/2000 |
| JP | 2000-193925 | 7/2000 |
| WO | WO 98/30934 | 7/1998 |

* cited by examiner

OPTICAL DEFLECTION DEVICE AND OPTICAL DEFLECTION METHOD THAT CONTROL OCCURRENCE OF ALIGNMENT DEFECT

This application is a divisional of U.S. application Ser. No. 10/441,125, filed May 20, 2003 now U.S. Pat. No. 7,038,835, which is based upon and claims the benefit of priority under 35 U.S.C. § 120, and under 35 U.S.C. § 119 from Japanese Applications 2002-153978, filed May 28, 2002 and 2003-101049, filed Apr. 4, 2003, the entire contents of each of which are incorporated herein by reference.

BACKGROUND OF THE INVENTION

1. Field of the Invention

The present invention relates to optical deflection devices and optical deflection methods.

2. Description of the Related Art

Conventionally, known optical deflection devices deflecting and emitting incident light by using optical deflection elements include electro-optical devices that use materials having great primary electro-optical effect (Pockels effect), such as $KH_2PO_4$ (KDP), $NH_4H_2PO_4$ (ADP), $LiNbO_3$, $LiTaO_3$, GaAs and CdTe, and materials having great secondary electro-optical effect, such as KTN, $SrTiO_3$, $CS_2$ and nitrobenzene, and include acousto-optical devices that use materials such as glass, silica and TeO2 (for example, refer to "Optoelectronic Device" edited by Masaharu Aoki, Shokodo). Also, there are proposed various optical deflection devices that use optical deflection elements including liquid crystal materials.

For example, as disclosed in Japanese Laid-Open Patent Applications No. 6-18940 and No. 5-313116, there are optical deflection devices (optical beam shifters) that reduce light losses. In addition, as disclosed in Japanese Laid-Open Patent Applications No. 2000-193925, No. 9-133931, and No. 5-204001, there are noptical deflection devices that are configured to reduce power of an optical deflecting operation by optical deflection elements and to achieve a smaller size.

Further, as disclosed in Japanese Laid-Open Patent Applications No. 6-194695, No. 6-258646, and No. 6-222368, there are optical deflection devices that extend deflection angles of optical deflection elements. Additionally, as disclosed in Japanese Laid-Open Patent Applications No. 9-133904, No. 2000-507005 (corresponding to International Publication No. WO98/30934), and No. 11-109304, there are optical deflection devices capable of adjusting deflection angles of optical deflection elements. Some of such optical deflection devices can adjust deflection angles of light paths of optical deflection elements without using mechanical moving parts that make the construction complicated, as disclosed in Japanese Laid-Open Patent Applications No. 7-64123 and No. 8-262391.

However, in a case where the electro-optical devices that use the materials having great primary electro-optical effect (Pockels effect) and materials having great secondary electro-optical effect, acousto-optical devices, and the like are used as optical deflection elements, generally, it is necessary to make the light path lengths long so as to obtain sufficiently great optical deflection amounts. For this reason, the present situation is that it is difficult to achieve smaller optical deflection devices, and the use of optical deflection devices is limited since the materials are expensive.

By the way, the above-described optical deflection devices are used for projection optical systems of image display apparatuses that display images displayed on image display elements on such as screens by using the projection optical systems, and for optical switches that use light path shift of an outgoing light with respect to an incident light.

Some image display apparatuses using optical deflection devices display images with improved apparent resolutions by shifting images displayed on image display elements at high-speed in accordance with time by optical deflection elements so as to cause afterimage phenomena in visual perception of human beings. The timings (shift timings) of optical deflection operations by optical deflection devices used for such image display apparatuses must be at speeds high enough to cause afterimage phenomena to visual perception of human beings and must not cause blurring in each image.

However, with the technique disclosed in Japanese Laid-Open Patent Application No. 6-18940, for example, it is difficult to make the speed of response faster to the order of sub-milliseconds, since a nematic liquid crystal is used for the liquid crystal material. Additionally, in the technique disclosed in Japanese Laid-Open Patent Application No. 9-133904, a smectic-A ferroelectric liquid crystal is used for the liquid crystal material. However, since a liquid crystal material in a smectic A phase does not produce spontaneous polarization, it is difficult to make the speed of response high enough. As described above, the optical deflection devices aimed at simplifying the constructions and miniaturization have problems in that it is difficult to speed up the light path shift operations because of the characteristics of the liquid crystal materials used.

Further, as disclosed in Japanese Laid-Open Patent Application No. 5-313116, for example, in a case where the light path shift operation is performed by moving each member arranged on a light path, it is necessary to move in parallel each member arranged on the light path at a high speed and with accuracy, which requires precision and durability of moving parts. With the above-described technique, light losses can be reduced, but problems arise such as occurrence of vibration and noise, and increase in the size of the apparatus.

In addition, as disclosed in Japanese Laid-Open Patent Application No. 6-324320, for example, there is disclosed an image display apparatus that divides an image displayed on an image display element into a plurality of fields, displays an image for each of the fields, and shifts the light path of each of the corresponding fields.

However, with the technique described in Japanese Laid-Open Patent Application No. 6-324320, the construction for driving the optical deflection element becomes complicated, which leads to high cost.

Additionally, Japanese Laid-Open Patent Application No. 10-133135, for example, discloses a technique aimed at entire miniaturization and achieving high precision and high resolution by interposing a translucent piezoelectric element between transparent electrodes and applying voltage so as to vary the thickness and shift the light path.

However, the technique disclosed in Japanese Laid-Open Patent Application No. 10-133135 requires a comparatively large transparent piezoelectric element, and thus the cost of the apparatus is increased.

As described above, in the conventional techniques, it is impossible for the optical deflection devices aimed for simplifying the constructions and miniaturization to sufficiently speed up the light path shift operations. Also, the optical deflection devices intended to speed up the light path shift operations have problems such as complexity of the constructions of the apparatuses, increase in cost caused by the complexity of the constructions of the apparatus, and increase in the sizes of the apparatuses.

The inventors of the present invention have found that high-speed pixel shift can be achieved with a comparatively simple construction: an optical deflection element that performs pixel shift such that liquid crystal molecules are oriented substantially perpendicularly between a pair of boards, and an electric field is generated in a direction substantially parallel to a liquid crystal layer so as to vary the direction of the liquid crystal molecules in a desired direction.

With the optical deflection element, by applying an ac voltage (for example, a square-wave voltage) on the order of several hundred Hz between the pair of electrodes, it is possible to emit lights by switching the light path of incident light in two directions with switching timing of several hundred Hz. As described above, the light path shift uses afterimage phenomena of eyes of human beings. Hence, the switching timing of the light path of incident light may be equal to or more than 30 Hz. However, in order to positively prevent flicker, preferably the switching timing is set to a hundred to several hundred Hz.

By the way, in such an optical deflection element, there is a case where a liquid crystal part becomes clouded when creating the optical deflection element or with successive light path shift driving. In a case where liquid crystal molecules are uniformly oriented perpendicularly in a liquid crystal layer, a black cross-like conoscope image, which is called isogyre, can be clearly observed in the liquid crystal layer. In the clouded part (white turbidity), the conoscope image is very indistinct. Additionally, isogyre is not observed at all in the strongly clouded part. This is the evidence that the perpendicular orientation state of the liquid crystal molecules is disturbed. The director of the liquid crystal molecules in the clouded part is irregular, and it is impossible to obtain a good light path shift function with the clouded optical deflection element. Such white turbidity may occur due to such as influence of an external electric field while the operation of the optical deflection element is suspended for a long time or even for a short period of time. In addition, with the optical deflection element where liquid crystal molecules being greatly disturbed though white turbidity does not occur, there is fear that reliability is degraded.

By the way, it is conceived that disturbance of orientation of liquid crystal molecules and white turbidity may occur due to influence of an external electric field and temperature variation while suspending the operation of optical deflection element. The optical deflection operation with white turbidity remaining causes light scattering and reduction of reliability through growth of alignment defect. Actually, it is confirmed that good light path shift is obtained by bringing liquid crystal molecules to the perpendicular orientation state before starting the optical deflection operation, even if there is no defect such as white turbidity.

SUMMARY OF THE INVENTION

It is a general object of the present invention to provide an improved and useful optical deflection device and optical deflection method in which the above-mentioned problems are eliminated.

It is another and more specific object of the present invention to speed up the light path shift operation by an optical deflection element having a simplified construction, and to control occurrence of alignment defect caused by repeated use so as to improve reliability of the optical deflection device.

It is still another object of the present invention to speed up the light path shift operation by an optical deflection element having a simplified construction, and to control occurrence of alignment defect caused by repeated use so as to achieve a uniform orientation of liquid crystal molecules in an entire liquid crystal layer.

It is yet another object of the present invention to form a perpendicular orientation state without defect before an optical deflection operation. In addition, that is, it is effective to use an optical deflection operation start process means for maintaining a long-term stable operation of the optical deflection device.

In order to achieve the above-mentioned objects, according to one aspect of the present invention, there is provided an optical deflection device that includes:

an optical deflection element having a pair of transparent boards arranged in a mutually opposing manner, a liquid crystal layer filled between the pair of boards and forming a chiral smectic C phase, an orientation film orienting liquid crystal molecules in the liquid crystal layer in a substantially perpendicular direction with respect to the liquid crystal layer, and electrodes generating an electric field in a substantially parallel direction with respect to the liquid crystal layer;

a first voltage application part applying, to the electrodes, an ac voltage of a deflection frequency switching the optical deflection direction of the optical deflection element;

a second voltage application part applying, to the electrodes, an ac voltage of a higher frequency than the deflection frequency; and a stop process part causing the second voltage application part to apply the ac voltage of the higher frequency than the deflection frequency after causing the first voltage application part to apply the ac voltage of the deflection frequency, when stopping an operation of switching the optical deflection direction of the optical deflection element.

Accordingly, the direction of an electric field formed in the liquid crystal layer is switched through applying the ac voltage of the deflection frequency to the pair of electrodes by the first voltage application part. The optical deflection direction of the optical deflection element is switched by switching the electric field direction. In addition, when stopping the operation of switching the optical deflection direction of the optical deflection element (when stopping the application of the ac voltage to the electrodes), the stop process part causes the second voltage application part to apply the ac voltage of the higher frequency than the deflection frequency, following the application of the ac voltage of the deflection frequency by the first voltage application part. Hence, in the liquid crystal layer, an electric field switching with a cycle shorter than the switching cycle of the optical deflection direction is formed. This high frequency electric field exerts a force to orient the liquid crystal molecules in the perpendicular direction also on the liquid crystal molecules in the vicinity of the intermediate layer of the liquid crystal layer. Thus, it is possible to bring, to the perpendicular orientation state, the liquid crystal molecules in a part having a tendency to develop white turbidity due to disarrangement in the orientation direction. Hence, it is possible to prevent development of a clouded part caused by fixing of disturbance of the orientation state.

Also, in the optical deflection device according to the present invention, the second voltage application part may apply, to the electrodes, an ac voltage having a period of a half cycle shorter than the response time of the liquid crystal molecules.

Accordingly, the response of the liquid crystal molecules is delayed with respect to the switching time of the electric field direction caused by applying the ac voltage by the second voltage application part. Consequently, the liquid crystal molecules are less slightly oscillated than in the original switching operation. Hence, when there is a part having a tendency to develop white turbidity due to disarrangement of the orientation direction, a force orienting the liquid crystal molecules in the part in the perpendicular direction is exerted, and the liquid crystal molecules are kept mobile by the slight oscillation. Accordingly, it is possible to quickly bring the liquid crystal molecules to the original perpendicular orientation state.

In addition, the second voltage application part may apply an ac voltage of a higher voltage value than the voltage value applied by the first voltage application part.

Accordingly, the force orienting the liquid crystal molecules in the perpendicular direction becomes greater. Hence, even when there is generated a part having a tendency to develop white turbidity, since the orientation state is disturbed through the optical deflection operation by the optical deflection element, it is possible to quickly bring the liquid crystal molecules to the original perpendicular orientation state.

However, in a case where a clouded part in which the orientation direction is disarranged is regionally generated in the liquid crystal layer, even if the liquid crystal molecules in the clouded part are brought to the perpendicular orientation state by applying a high frequency voltage, in some cases, the interface of the clouded part and a normal part bears the mark.

Consequently, the optical deflection device according to the present invention may further include:

a third voltage application part applying a pulsed dc voltage to the electrodes, wherein, when stopping the operation of switching the optical deflection direction of the optical deflection element, the stop process part may cause the second voltage application part to apply the ac voltage of the higher frequency than the deflection frequency, after causing the first voltage application part to apply the ac voltage of the deflection frequency and subsequently causing the third voltage application part to intermittently apply the pulsed dc voltage.

Accordingly, the direction of an electric field formed in the liquid crystal layer is switched through applying the ac voltage of the deflection frequency to the pair of electrodes by the first voltage application part. The optical deflection direction of the optical deflection element is switched by switching the electric field direction. Additionally, when stopping the operation of switching the optical deflection direction of the optical deflection element (when stopping the application of the ac voltage to the electrodes), the stop process part causes the third voltage application part to intermittently apply the pulsed dc voltage, following the application of the ac voltage of the deflection frequency by the first voltage application part. Thus, after the orientation state of the liquid crystal molecules is temporarily disturbed throughout the liquid crystal layer, the ac voltage of the higher frequency than the deflection frequency is applied by the second voltage application part. Hence, in the liquid crystal layer, before stopping the operation of switching the optical deflection direction of the optical deflection element, an electric field that switches with a shorter cycle than the switching cycle of the optical deflection direction is formed.

In other words, when a pulsed dc electric field is intermittently applied, the orientation of the entire liquid crystal layer is greatly disturbed. As a result, the entire liquid crystal layer assumes a state where white turbidity is easily developed. Accordingly, the interface of the clouded part and the normal part no longer exists. Thereafter, by applying a high frequency electric field, the entire liquid crystal layer is brought to the uniform perpendicular orientation state. Hence, it is possible to prevent the interface of a clouded part and a normal part from bearing the mark.

In addition, according to another aspect of the present invention, there is also provided an optical deflection device that includes:

an optical deflection element having a pair of transparent boards arranged in a mutually opposing manner, a liquid crystal layer filled between the pair of boards and forming a chiral smectic C phase, an orientation film orienting liquid crystal molecules in the liquid crystal layer in a substantially perpendicular direction with respect to the liquid crystal layer, and electrodes generating an electric field in a substantially parallel direction with respect to the liquid crystal layer;

a first voltage application part applying, to the electrodes, an ac voltage of a deflection frequency switching the optical deflection direction of the optical deflection element;

a third voltage application part applying a pulsed dc voltage to the electrodes; and a stop process part causing the third voltage application part to intermittently apply the pulsed dc voltage after causing the first voltage application part to apply the ac voltage of the deflection frequency, when stopping the operation of switching the optical deflection direction of the optical deflection element.

Accordingly, the direction of the electric field formed in the liquid crystal layer is switched by applying the ac voltage of the deflection frequency to the pair of electrodes by the first voltage application part. Also, the optical deflection direction of the optical deflection element is switched by switching the electric field. In addition, when stopping the operation of switching the optical deflection direction of the optical deflection element, following the application of the ac voltage of the deflection frequency by the first voltage application part, the stop process part causes the third voltage application part to intermittently apply the pulsed dc voltage. Hence, it is possible to realize the uniform perpendicular orientation state in the entire liquid crystal layer when the liquid crystal molecules are caused to spontaneously orient themselves by the orientation control force of the perpendicular orientation film after the orientation state of the liquid crystal molecules is temporarily disturbed throughout the liquid crystal layer.

Additionally, in each of the above-described optical deflection devices, the third voltage application part may apply the dc voltage of a higher voltage value than the voltage value applied by the first voltage application part.

Accordingly, it is possible to more effectively disturb the orientation state of the liquid crystal molecules throughout the liquid crystal layer. Thus, it is possible to efficiently disturb and eliminate the mark of the interface of the clouded part and the normal part. Hence, it is possible to realize the uniform perpendicular orientation state in the entire liquid crystal layer when the liquid crystal molecules are caused to spontaneously reorient themselves by the orientation control force of the perpendicular orientation film.

Additionally, in each of the optical deflection devices, the dielectric anisotropy of the liquid crystal layer forming the chiral smectic C phase may be negative in a frequency band of an ac voltage having a period of a half cycle shorter than the response time of the liquid crystal molecules.

Accordingly, the dielectric anisotropy of the liquid crystal layer forming the chiral smectic C phase is negative. Consequently, when a high frequency electric field is formed in a substantially parallel direction with respect to the liquid crystal layer by applying the voltage to the electrodes, the liquid crystal molecules attempt to assume the orientation state in a substantially perpendicular direction with respect to the liquid crystal layer so that the electrostatic energy is minimized. Hence, it is possible to exert an electrostatic orientation force on the intermediate part of the liquid crystal layer, in addition to the orientation control force in the vicinity of the board applied by the orientation film. Accordingly, it is possible to positively cause the liquid crystal molecules to assume the perpendicular orientation state.

Additionally, according to another aspect of the present invention, there is also provided an optical deflection device than includes:

an optical deflection element having a pair of transparent boards arranged in a mutually opposing manner, a liquid crystal layer filled between said pair of boards and forming a chiral smectic C phase, an orientation film orienting liquid crystal molecules in said liquid crystal layer in a substantially perpendicular direction with respect to said liquid crystal layer, and electrodes generating an electric field in a substantially parallel direction with respect to said liquid crystal layer;

a fourth voltage application part applying, to said electrodes, an ac voltage of a deflection frequency switching an optical deflection direction of said optical deflection element by varying a voltage value of the ac voltage; and a stop process part decreasing the voltage value of the ac voltage of the deflection frequency applied by said fourth voltage application part continuously or in stages and stopping the application at a voltage value smaller than the voltage value capable of switching the optical deflection direction, when stopping the operation of switching the optical deflection direction of the optical deflection element.

Accordingly, the direction of an electric field formed in the liquid crystal layer is switched by applying an ac voltage of the deflection frequency to the pair of electrodes by the fourth voltage application part. Also, the optical deflection direction of the optical deflection element is switched by switching the electric field direction. In addition, when stopping the operation of switching the optical deflection direction of the optical deflection element, the stop process part decreases, continuously or in stages, the voltage value of the ac voltage of the deflection frequency applied by the fourth voltage application part and stops the application at a voltage value lower than the voltage value capable of switching the optical deflection direction. Hence, as the applied voltage value becomes lower than the voltage for a saturation electric field (the voltage value for applying a saturation electric field to a liquid crystal) for switching the liquid crystal molecules, it is possible to stop the application near a state where the liquid crystal molecules are brought to the perpendicular state. Thus, it is possible to prevent the liquid crystal molecules from being disturbed in stopping the optical deflection operation. It should be noted that the voltage value smaller than the voltage value of the saturation electric field for switching the liquid crystal molecules includes a state where the voltage value is zero.

Additionally, according to another aspect of the present invention, there is also provided an optical deflection device that includes:

an optical deflection element having a pair of transparent boards arranged in a mutually opposing manner, a liquid crystal layer filled between said pair of boards and forming a chiral smectic C phase, an orientation film orienting liquid crystal molecules in said liquid crystal layer in a substantially perpendicular direction with respect to said liquid crystal layer, and electrodes generating an electric field in a substantially parallel direction with respect to said liquid crystal layer;

a first voltage application part applying, to said electrodes, an ac voltage of a deflection frequency switching an optical deflection direction of said optical deflection element;

a second voltage application part applying, to said electrodes, an ac voltage of a frequency different from the deflection frequency; and a start process part causing said first voltage application part to apply the ac voltage of the deflection frequency after causing said second voltage application part to apply the ac voltage of a higher frequency than the deflection frequency, when starting an operation of switching the optical deflection direction of the optical deflection element.

It should be noted that "when starting an operation of switching the optical deflection direction of the optical deflection element" refers to a period before the application of the ac voltage of the deflection frequency is started by the first voltage application part so as to perform the original optical deflection operation, and more particularly, preferably, immediately before starting the application of the ac voltage of the deflection frequency by the first voltage application part.

Accordingly, the direction of an electric field formed in the liquid crystal layer is switched by applying the ac voltage of the deflection frequency to the pair of electrodes. Also, the optical deflection direction of the optical deflection element is switched by switching the electric field direction. In addition, when starting the operation of switching the optical deflection direction of the optical deflection element, the start process part causes the second voltage application part to apply the ac voltage of the higher frequency than the deflection frequency, and thereafter causes the first voltage application part to apply the ac voltage of the deflection frequency. Thus, an electric field switched with a shorter cycle than the switching cycle of the optical deflection direction is formed in the liquid crystal layer. This high frequency electric field exerts a force to orient the liquid crystal molecules in the perpendicular direction on the liquid crystal molecules in the vicinity of the intermediate layer of the liquid crystal layer. Thus, it is possible to bring, to the perpendicular orientation state, the liquid crystal molecules in a part having a tendency to form white turbidity since the orientation direction is disturbed during the stoppage of the optical deflection element. Hence, it is possible to prevent generation of a clouded part caused when disturbance of the orientation state is fixed.

In addition, in the above-described optical deflection device, the second voltage application part may apply, to the electrodes; the ac voltage of a higher frequency than the deflection frequency by first applying the ac voltage of a lower frequency than the deflection frequency and thereafter increasing the frequency of the ac voltage continuously or in stages, and the start process part may cause the first voltage application part to apply the ac voltage of the deflection frequency following the application of the ac voltage of a higher frequency than the deflection frequency by the second voltage application part, when starting the operation of switching the optical deflection direction of the optical deflection element.

Accordingly, even in a case where the directions of the liquid crystal molecules are disturbed by influence of such as an external electric field and temperature variation while operation of the optical deflection element is stopped, by giving oscillation to the liquid crystal layer using the ac voltage of a comparatively low frequency so as to make the liquid crystal layer easily flow and change the orientation state, and thereafter increasing the frequency continuously or in stages so as to apply the ac voltage of a high frequency, it is possible to positively obtain the perpendicular orientation state.

Additionally, in the above-described optical deflection device, the second voltage application part may apply, to the electrodes, the ac voltage of a higher frequency than the deflection frequency, and thereafter decrease the frequency of the ac voltage continuously or in stages so as to apply the ac voltage of the deflection frequency to the electrodes, and the start process part may cause the first voltage application part to apply the ac voltage of the deflection frequency, following the application of the ac voltage of the deflection frequency by the second voltage application part, when starting the operation of switching the optical deflection direction of the optical deflection element.

Accordingly, even in a case where the directions of the liquid crystal molecules are disturbed by influence of such as an external electric field while the operation of the optical deflection element is stopped, the directions of the liquid crystal molecules are brought to the perpendicular state by the ac voltage of a high frequency. Thereafter, the frequency is decreased continuously or in stages so as to apply the deflection frequency. Hence, it is possible to prevent disturbance of the liquid crystal molecules that tends to occur when rapidly switching the frequency to the deflection frequency.

Further, the second voltage application part may apply, to the electrodes, an ac voltage having a period of a half cycle shorter than the response time of the liquid crystal molecules.

Accordingly, the response of the liquid crystal molecules is delayed for the switching time of the electric field caused by applying the ac voltage by the second voltage application part. Consequently, the liquid crystal molecules are slightly less oscillated than in the original switching operation. Hence, when there is a part having a tendency to form white turbidity since the orientation direction is disturbed, it is possible to exert a force to orient, in the perpendicular direction, the liquid crystal molecules in the part and to quickly bring the liquid crystal molecules to assume the original perpendicular orientation state, since the liquid crystal molecules are kept mobile with the slight oscillation.

In addition, the second voltage application part may apply the ac voltage of a higher voltage value than the voltage value applied by the first voltage application part.

Accordingly, an electrostatic energy exerted on the liquid crystal molecules is increased, and a force to orient the liquid crystal molecules in the perpendicular direction becomes greater. Hence, even in a case where a part having a tendency to form white turbidity is generated since the orientation state is disturbed by the optical deflection operation of the optical deflection element, it is possible to quickly bring the liquid crystal molecules to the original perpendicular orientation state.

Additionally, when starting the operation of switching the optical deflection direction of the optical deflection element, the second voltage application part may apply the ac voltage of a lower voltage value than the voltage value applied by the first voltage application part, and thereafter increase the voltage value of the ac voltage continuously or in stages so as to apply the deflection operation voltage value.

Accordingly, in a case where disturbance of the liquid crystal molecules occurs while the operation of the optical deflection element is stopped, it is possible to make the liquid crystal molecules switch at an angle nearer to perpendicular than the switching position of the optical deflection direction by applying a voltage lower than the voltage for the saturation electric field of switching the liquid crystal molecules at the beginning. Also, it is possible to bring the liquid crystal molecules closer to the angle of the optical deflection direction continuously or in stages by increasing the applied voltage value continuously or in stages. Hence, it is possible to prevent disturbance of the liquid crystal molecules due to rapid switching to the deflection frequency.

However, when a clouded part where the orientation direction is locally disturbed in the liquid crystal layer is generated, even if the liquid crystal molecules in the clouded part are brought to the perpendicular orientation state by applying a high frequency voltage, there is a case where the interface portion of the clouded part and a normal part bears the mark. Consequently, the optical deflection device may further include:

a third voltage application part applying a pulsed dc voltage to the electrodes, wherein, when starting the operation of switching the optical deflection direction of the optical deflection element, the start process part may cause the second voltage application part to apply the ac voltage of a higher frequency than the deflection frequency, following intermittent application of the pulsed dc voltage by the third voltage application part, and thereafter cause the first voltage application part to apply the ac voltage of the deflection frequency.

Accordingly, by intermittently applying the pulsed dc voltage by the third voltage application part, the orientation of the entire liquid crystal layer is greatly disturbed, and the entire liquid crystal layer temporarily assumes a state where white turbidity is easily formed. Thus, the interface portion of the clouded part and the normal part is eliminated. Thereafter, the entire liquid crystal layer can be brought to the uniform perpendicular orientation state by applying a high frequency electric field. Hence, it is possible to prevent the interface portion of the clouded part and the normal part from bearing the mark.

In addition, according to another aspect of the present invention, there is also provided an optical deflection device that includes:

an optical deflection element having a pair of transparent boards arranged in a mutually opposing manner, a liquid crystal layer filled between said pair of boards and forming a chiral smectic C phase, an orientation film orienting liquid crystal molecules in said liquid crystal layer in a substantially perpendicular direction with respect to said liquid crystal layer, and electrodes generating an electric field in a substantially parallel direction with respect to said liquid crystal layer;

a first voltage application part applying, to said electrodes, an ac voltage of a deflection frequency switching an optical deflection direction of said optical deflection element;

a third voltage application part applying a pulsed dc voltage to said electrodes; and a start process part causing said third voltage application part to intermittently apply the pulsed dc voltage and thereafter causing said first voltage application part to apply the ac voltage of the deflection frequency, when starting an operation of switching the optical deflection direction of the optical deflection element.

Accordingly, the orientation state of the liquid crystal molecules is temporarily disturbed throughout the liquid crystal layer by intermittently applying the pulsed dc voltage by the third voltage application part. Thereafter, the liquid crystal molecules can be arranged in the optical deflection direction by applying the ac voltage of the deflection frequency. Hence, it is possible to prevent the interface portion of the clouded part and the normal part from bearing the mark, even if there is white turbidity caused by the application of the pulsed dc voltage before starting the optical deflection operation. Moreover, a short interval of time will be needed for the operation of the start process part.

In addition, the third voltage application part may apply the dc voltage of a higher voltage value than the voltage value applied by the first voltage application part.

Accordingly, the orientation state of the liquid crystal molecules may be more effectively disturbed temporarily. Thus, it is possible to effectively disturb and eliminate the mark of the interface portion of the clouded part and the normal part.

Additionally, the dielectric anisotropy of the liquid crystal layer forming the chiral smectic C phase may be negative in the frequency band of the ac voltage having a period of a half cycle shorter than the response time of the liquid crystal molecules.

When the dielectric anisotropy of the liquid crystal layer forming the chiral smectic C phase is negative, if a high frequency electric field is formed in a substantially parallel direction with respect to the liquid crystal layer by applying voltage to the electrodes, the liquid crystal molecules try to assume the orientation state in a substantially perpendicular direction with respect to the liquid crystal layer so as to minimize the electrostatic energy. Hence, in addition to the orientation control force in the vicinity of the board by the orientation film, it is possible to also exert an electrostatic orientation force on the intermediate portion of the liquid crystal layer so as to positively cause the liquid crystal molecules to assume the perpendicular orientation state.

Further, according to another aspect of the present invention, there is also provided an optical deflection method that includes:

an optical deflection step of applying, to electrodes, an ac voltage of a deflection frequency switching the optical deflection direction of an optical deflection element, the optical deflection element having a pair of transparent boards arranged in a mutually opposing manner, a liquid crystal layer filled between the pair of boards and forming a chiral smectic C phase, an orientation film orienting liquid crystal molecules in the liquid crystal layer in a substantially perpendicular direction with respect to the liquid crystal layer, and the electrodes generating an electric field in a substantially parallel direction with respect to the liquid crystal layer; and an application stop step of applying, to the electrodes, an ac voltage of a higher frequency than the deflection frequency, following the optical deflection step, when stopping an operation of switching the optical deflection direction of the optical deflection element.

Accordingly, in the optical deflection step, the direction of the electric field formed in the liquid crystal layer is switched through applying the ac voltage of the deflection frequency to the pair of electrodes. Also, the optical deflection direction of the optical deflection element is switched by switching the electric field direction. In addition, when stopping the operation of switching the optical deflection direction of the optical deflection element, following the application of the ac voltage of the deflection frequency, the ac voltage of the higher frequency than the deflection frequency is applied. Hence, in the liquid crystal layer, an electric field switching with a cycle shorter than the switching cycle of the optical deflection direction is formed. This high frequency electric field exerts a force to orient the liquid crystal molecules in the perpendicular direction also on the liquid crystal molecules in the vicinity of the intermediate layer of the liquid crystal layer. Thus, it is possible to bring, to the perpendicular orientation state, the liquid crystal molecules in a part having a tendency to develop white turbidity due to disarrangement of the orientation direction. Hence, it is possible to prevent generation of a clouded part caused when disturbance of the orientation direction is fixed.

Additionally, according to another aspect of the present invention, there is also provided an optical deflection method that includes:

an optical deflection step of applying, to electrodes, an ac voltage of a deflection frequency switching the optical deflection direction of an optical deflection element, the optical deflection element having a pair of transparent boards arranged in a mutually opposing manner, a liquid crystal layer filled between the pair of boards and forming a chiral smectic C phase, an orientation film orienting liquid crystal molecules in the liquid crystal layer in a substantially perpendicular direction with respect to the liquid crystal layer, and the electrodes generating an electric field in a substantially parallel direction with respect to the liquid crystal layer; and an application stop step of intermittently applying a pulsed dc current to the electrodes, following the optical deflection step, when stopping an operation of switching the optical deflection direction of the optical deflection element.

Accordingly, in the optical deflection step, the direction of the electric field formed in the liquid crystal layer is switched through applying the ac voltage of the deflection frequency to the pair of electrodes. Also, the optical deflection direction of the optical deflection element is switched by switching the electric field direction. Additionally, in the application stop step, when stopping the operation of switching the optical deflection direction of the optical deflection element, following the application of the ac voltage of the deflection frequency, the pulsed dc voltage is intermittently applied. Thus, the orientation state of the liquid crystal molecules is temporarily disturbed throughout the liquid crystal layer. Thereafter, it is possible to make the entire liquid crystal layer to assume the uniform perpendicular orientation state when the liquid crystal molecules are caused to spontaneously reorient themselves by the orientation control force of the perpendicular orientation film.

Further, according to another aspect of the present invention, there is also provided an optical deflection method that includes:

an optical deflection step of applying, to electrodes, an ac voltage of a deflection frequency switching the optical deflection direction of an optical deflection element, the optical deflection element having a pair of transparent boards arranged in a mutually opposing manner, a liquid crystal layer filled between the pair of boards and forming a chiral smectic C phase, an orientation film orienting liquid crystal molecules in the liquid crystal layer in a substantially perpendicular direction with respect to the liquid crystal layer, and the electrodes generating an electric field in a substantially parallel direction with respect to the liquid crystal layer;

an orientation cancel step of intermittently applying a pulsed dc voltage to the electrodes, following the optical deflection step, when stopping an operation of switching the optical deflection direction of the optical deflection element; and an application stop step of applying, to the electrodes, an ac voltage of a higher frequency than the deflection frequency, following the orientation cancel step.

Accordingly, in the optical deflection step, the direction of an electric field formed in the liquid crystal layer is switched through applying the ac voltage of the deflection frequency to the pair of electrodes. The optical deflection direction of the optical deflection element is switched by switching the electric field direction. Additionally, when stopping the operation of switching the optical deflection direction of the optical deflection element, in the orientation cancel step, following the application of the ac voltage of the deflection frequency, the pulsed dc voltage is intermittently applied. Thus, after the orientation state of the liquid crystal molecules is temporarily disturbed throughout the liquid crystal layer, in the application stop step, the ac voltage of the higher frequency than the deflection frequency is applied. Hence, in the liquid crystal layer, an electric field that switches with a shorter cycle than the switching cycle of the optical deflection direction is formed. In other words, when the pulsed dc electric field is intermittently applied, the orientation of the entire liquid crystal layer is greatly disturbed. As a result, the entire liquid crystal layer assumes a state where white turbidity is easily developed. Thereafter, the interface of the clouded part and the normal part no longer exists. Thereafter, by applying a high frequency electric field, the entire liquid crystal layer is brought to the uniform orientation state. Hence, it is possible to prevent the interface of the clouded part and the normal part from bearing the mark.

In addition, according to another aspect of the present invention, there is also provided an optical deflection method that includes:

an optical deflection step of applying, to electrodes, an ac voltage of a deflection frequency switching an optical deflection direction of an optical deflection element, said optical deflection element having a pair of transparent boards arranged in a mutually opposing manner, a liquid crystal layer filled between said pair of boards and forming a chiral smectic C phase, an orientation film orienting liquid crystal molecules in said liquid crystal layer in a substantially perpendicular direction with respect to said liquid crystal layer, and said electrodes generating an electric field in a substantially parallel direction with respect to said liquid crystal layer; and an application stop step of decreasing continuously or in stages a voltage value of the ac voltage of the deflection frequency, following said optical deflection step, so as to stop the application at a voltage value smaller than the voltage value capable of switching the optical deflection direction.

Accordingly, in the optical deflection step, the direction of the electric field formed in the liquid crystal layer is switched by applying the ac voltage of the deflection frequency to the pair of electrodes. Also, the optical deflection direction of the optical deflection element is switched by the switching of the electric field direction. In addition, in the application stop step, the voltage value of the applied ac voltage of the deflection frequency is decreased continuously or in stages so as to stop the application at a voltage value lower than the voltage value capable of switching the optical deflection direction. Thus, as the applied voltage value becomes lower than the voltage value for the saturation electric field of switching the liquid crystal molecules, it is possible to stop the application near a state where the liquid crystal molecules are brought to the perpendicular state. Hence, it is possible to prevent disturbance of the liquid crystal molecules caused in stopping the optical deflection operation. It should be noted that the voltage value lower than the voltage for the saturation electric field of switching the liquid crystal molecules includes a state where the voltage value is zero.

Additionally, according to another aspect of the present invention, there is also provided an optical deflection method that includes:

an optical deflection step of applying, to electrodes, an ac voltage of a deflection frequency switching an optical deflection direction of an optical deflection element, said optical deflection element having a pair of transparent boards arranged in a mutually opposing manner, a liquid crystal layer filled between said pair of boards and forming a chiral smectic C phase, an orientation film orienting liquid crystal molecules in said liquid crystal layer in a substantially perpendicular direction with respect to said liquid crystal layer, and said electrodes generating an electric field in a substantially parallel direction with respect to said liquid crystal layer; and an application start step of applying an ac voltage of a higher frequency than the deflection frequency before said optical deflection step.

Accordingly, in the optical deflection step, the direction of the electric field formed in the liquid crystal layer is switched by applying the ac voltage of the deflection frequency to the pair of electrodes. Also, the optical deflection direction by the optical deflection element is switched by the switching of the electric field direction. In addition, in the application start step, when starting the operation of switching the optical deflection direction of the optical deflection element, an ac voltage of a higher frequency than the deflection frequency is applied before applying the ac voltage of the deflection frequency. Thus, an electric field switching with a shorter cycle than the switching cycle of the optical deflection direction is formed in the liquid crystal layer. This high frequency electric field exerts a force to orient the liquid crystal molecules in the perpendicular direction on the liquid crystal molecules in the vicinity of the intermediate layer of the liquid crystal layer. Thus, it is possible to bring, to the perpendicular orientation state, a part having a tendency to form white turbidity since the orientation direction is disturbed.

Further, according to another aspect of the present invention, there is also provided an optical deflection method that includes:

an optical deflection step of applying, to electrodes, an ac voltage of a deflection frequency switching an optical deflection direction of an optical deflection element, said optical deflection element having a pair of transparent boards arranged in a mutually opposing manner, a liquid crystal layer filled between said pair of boards and forming a chiral smectic C phase, an orientation film orienting liquid crystal molecules in said liquid crystal layer in a substantially perpendicular direction with respect to said liquid crystal layer, and said electrodes generating an electric field in a substantially parallel direction with respect to said liquid crystal layer; and an application start step of intermittently applying a pulsed dc voltage before said optical deflection step.

Accordingly, in the optical deflection step, the direction of the electric field formed in the liquid crystal layer is switched by applying the ac voltage of the deflection frequency to the pair of electrodes. Also, the optical deflection direction by the optical deflection element is switched by the switching of the electric field direction. In addition, in the application stop step, when starting the operation of switching the optical deflection direction of the optical deflection element, the pulsed dc voltage is intermittently applied before applying the ac voltage of the deflection frequency. Consequently, the orientation state of the liquid crystal molecules is temporarily disturbed throughout the liquid crystal layer. Thereafter, by applying the ac voltage of the deflection frequency, it is possible to arrange the liquid crystal molecules in the optical deflection direction.

In addition, according to another aspect of the present invention, there is also provided an optical deflection method that includes:

an optical deflection step of applying, to electrodes, an ac voltage of a deflection frequency switching an optical deflection direction of an optical deflection element, said optical deflection element having a pair of transparent boards arranged in a mutually opposing manner, a liquid crystal layer filled between said pair of boards and forming a chiral smectic C phase, an orientation film orienting liquid crystal molecules in said liquid crystal layer in a substantially perpendicular direction with respect to said liquid crystal layer, and said electrodes generating an electric field in a substantially parallel direction with respect to said liquid crystal layer;

an orientation cancel step of intermittently applying a pulsed dc voltage to said electrodes before said optical deflection step; and an application start step of applying an ac voltage of a higher frequency than the deflection frequency, following said orientation cancel step.

Accordingly, in the optical deflection step, the direction of the electric field formed in the liquid crystal layer is switched by applying the ac voltage of the deflection frequency to the pair of electrodes. Also, the optical deflection direction of the optical deflection element is switched by the switching of the electric field direction. In addition, when starting the operation of switching the optical deflection direction of the optical deflection element, the pulsed dc voltage is intermittently applied before applying the ac voltage of the deflection frequency. Consequently, the orientation state of the liquid crystal molecules is temporarily disturbed throughout the liquid crystal layer, and thereafter the ac voltage of the higher frequency than the deflection frequency is applied. Thus, an electric field switching with a shorter cycle than the switching cycle of the optical deflection direction is formed in the liquid crystal layer. In other words, when a pulsed dc electric field is intermittently applied, the orientation of the entire liquid crystal layer is greatly disturbed, and the entire liquid crystal layer assumes a state where white turbidity is easily formed. Thus, the interface portion of the clouded part and the normal part does not exist anymore. Thereafter, the entire liquid crystal layer is brought to the uniform orientation state by applying a high frequency electric field thereto. Hence, it is possible to prevent the interface portion of the clouded part and the normal part from bearing the mark.

Other objects, features and advantages of the present invention will become more apparent from the following detailed description when read in conjunction with the following drawings.

DETAILED DESCRIPTION OF THE PREFERRED EMBODIMENTS

Referring to FIGS. 1A through 4, a description will be given of a first embodiment of the present invention. This embodiment shows an example where the present invention is applied to an optical deflection device.

Figure 1A:
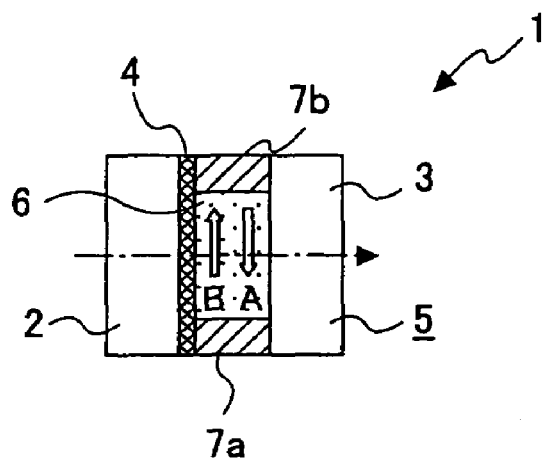
FIGS. 1A, 1B, and 1C are a plan view, a front cross-sectional view, and a side elevational view, respectively, showing in principle a construction example of the optical deflection device according to a first embodiment of the present invention.
Figure 1B:
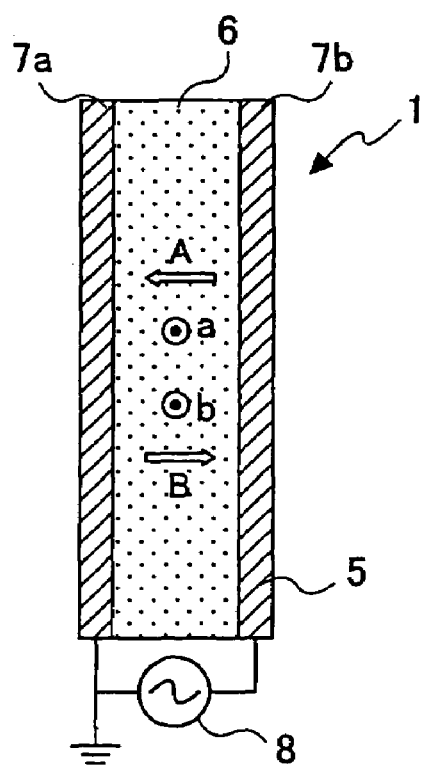
Figure 1C:
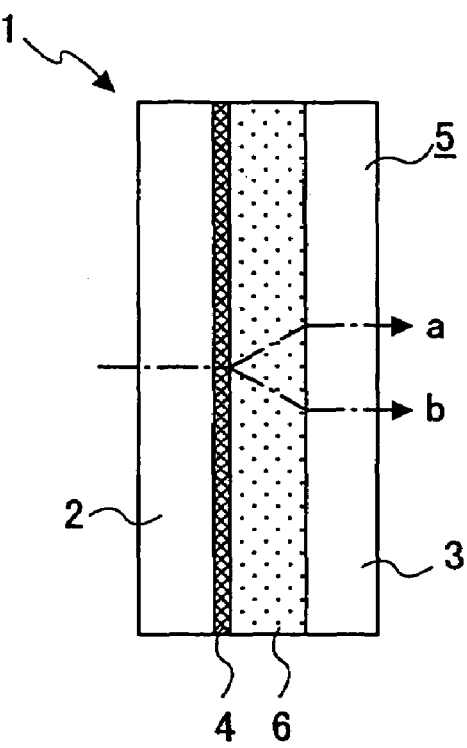

FIGS. 1A, 1B and 1C show in principle a construction example of an optical deflection device according to this embodiment. FIG. 1A is a plan view, FIG. 1B is a front cross-sectional view, and FIG. 1C is a side elevational view of the optical deflection device. As shown in FIG. 1C, an optical deflection device 1 is provided with an optical deflection element 5 that includes a pair of transparent boards 2 and 3 arranged in a mutually opposing manner, an orientation film (perpendicular orientation film) 4 provided on the board 2, and a liquid crystal layer 6 of a ferroelectric liquid crystal forming a chiral smectic C phase filled between the orientation film 4 and the board 3. In this embodiment, the orientation film 4 is provided only on the board 2. However, this is not a limitation. At least one of the pair of boards 2 and 3 is provided with the orientation film 4: the orientation film 4 may be provided on the board 3 or on the boards 2 and 3 (refer to FIG. 2). Additionally, in this embodiment, it is assumed that light is incident on the board 2 and emitted from the board 3.

A description will be given of liquid crystal. "Smectic liquid crystal" is a liquid crystal layer formed such that layers where liquid crystal molecules are arranged in parallel are stacked in the longitudinal direction of the liquid crystal molecules. Regarding such liquid crystal, the liquid crystal where the normal line direction (layer normal line direction) of the liquid crystal layer matches the longitudinal direction of the liquid crystal molecules is called "smectic A phase", and the liquid crystal where the normal line direction does not match the longitudinal direction of the liquid crystal molecules is called "smectic C phase". Generally, a ferroelectric liquid crystal in the smectic C phase takes the form of a so-called helical structure where the directions of the liquid crystal molecules are rotated in a helical manner through the layers in a state where an electric field is not applied, which is called a "chiral smectic C phase". The "chiral smectic C phase" includes antiferroelectric liquid crystal in a smectic C phase where the directions of the liquid crystal molecules are opposite from layer to layer. Liquid crystal in a chiral smectic C phase includes asymmetric carbon in the molecular structure, which develops spontaneous polarization. Hence, it is possible to control the optical characteristics of a liquid crystal in the chiral smectic C phase by rearranging liquid crystal molecules in the direction determined by a spontaneous polarization Ps and an external electric field E. It should be noted that, in this embodiment, a description will be given by taking a ferroelectric liquid crystal as an example of the liquid crystal layer 6. However, the ferroelectric liquid crystal is not a limitation, and an antiferroelectric liquid crystal may be similarly used as the liquid crystal layer 6.

A ferroelectric liquid crystal in the chiral smectic C phase is constructed by a main chain, a spacer, a bone structure, a bonding part, a chiral part, and the like. Polyacrylate, polymethacrylate, polysiloxane, polyoxyethylene, or the like may be used as the main chain construction. The spacer is for bonding, to the main chain, the bone structure that takes charge of molecular rotation, the bonding part, and the chiral part. The methylene chain having a suitable length or the like is chosen for the spacer. In addition, —COO— bond or the like is chosen for the bond part that bonds the chiral part to the adamant bone structure such as a biphenyl structure.

Figure 2:
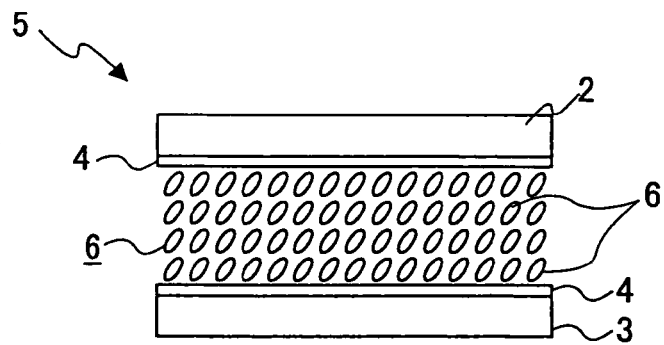
FIG. 2 is a side elevational view showing an orientation state of liquid crystal molecules in a liquid crystal layer.

As shown in FIG. 2, the liquid crystal molecules 6a in the liquid crystal layer 6 of the ferroelectric liquid crystal in the chiral smectic C phase are oriented by the orientation film 4 such that the rotation axis of helical rotation of the liquid crystal molecules 6a is directed in the substantially perpendicular direction to the surfaces of the boards 2 and 3. In the embodiments, the state where the rotation axis of the helical rotation of the liquid crystal molecules 6a is oriented to be substantially perpendicular to the surfaces of the boards 2 and 3 as shown in FIG. 2 is regarded such that the liquid crystal molecules 6a are oriented in the perpendicular direction on average. Hereinafter, this state is referred to as a "substantially perpendicular state" or "substantially perpendicular orientation state". It should be noted that FIG. 2 shows the state where the orientation film 4 is provided on each of the pair of boards 2 and 3.

Figure 3:
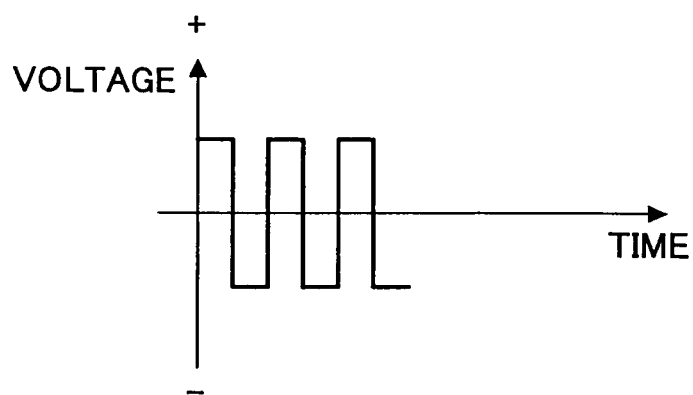
FIG. 3 is a timing diagram showing the waveform of an ac voltage applied between a pair of electrodes.

As shown in FIG. 1A, the optical deflection element 5 is provided with a pair of electrodes 7a and 7b arranged in the positions that do not overlap with the incident light path to the optical deflection element 5. The pair of electrodes 7a and 7b are connected to a first power supply 8 that functions as first and second voltage application means. The first power supply 8 applies an ac voltage having a driving frequency on the order of several hundred Hz between the pair of electrodes 7a and 7b. The first power supply 8 is constructed such that two kinds of ac voltages can be applied to the pair of electrodes 7a and 7b: an ac voltage of a deflection frequency that switches the optical deflection direction of the optical deflection element 5, and an ac voltage of a frequency higher than the deflection frequency, though an illustration and description thereof will be omitted since it is well known in the art. In this embodiment, the deflection frequency is set to several hundred Hz. The ac voltages applied between the pair of electrodes 7a and 7b include an ac voltage having a square wave as shown in FIG. 3, for example.

When the first power supply 8 applies a voltage between the pair of electrodes 7a and 7b, an electric field is formed in the direction that is substantially parallel to the layer direction of the liquid crystal layer 6 and substantially perpendicular to the rotation axis of the helical rotation of the liquid crystal molecules 6 in the liquid crystal layer 6. Since the first power supply 8 in this embodiment applies an ac voltage between the pair of electrodes 7a and 7b, an electric field having electric field vectors in two directions, that is, a first electric field direction A and a second electric field direction B, is formed between the pair of electrodes 7a and 7b depending on the polarity of the applied voltage (refer to FIGS. 1A and 1B).

As shown in FIGS. 1A and 1B, the electric field vector in the first electric field direction A occurs when a positive voltage is applied to the electrode 7a, and the electric field vector in the second electric field direction B occurs when a negative voltage is applied to the electrode 7a.

The liquid crystal molecules 6a in the liquid crystal layer 6 vary the orientation direction to be along the electric field formed in the liquid crystal layer 6. The light incident on the board 2 is deflected and emitted from the board 3 according to the variation of the orientation state of the liquid crystal molecules 6. When an electric field having the electric field vector in the first electric field direction A is formed, the light path of an incident light is deflected to be a first outgoing light a. When an electric field having the electric field vector in the second electric field direction B is formed, the light path of an incident light is deflected to be a second outgoing light b. In other words, the light incident on the optical deflection element 5 is subjected to optical deflection in the different directions depending on the direction of the electric field vector of an electric field that occurs between the pair of the electrodes 7a and 7b. In this embodiment, the pair of electrodes 7a and 7b are arranged so that an incident light corresponds to the target optical deflection directions.

In addition, the pair of electrodes 7a and 7b also serve as spacers that regulate the thickness of the liquid crystal layer 6 by maintaining the distance between the pair of boards 2 and 3 to be constant.

In such a construction, on the occasion of the optical deflection operation of the optical deflection device 1, an ac voltage of the deflection frequency on the order of several hundred Hz is applied between the pair of electrodes 7a and 7b by the first power source 8. Thus, the optical deflection direction is switched with switching timing of several hundred Hz so that an incident light on the optical deflection element 5 takes the light path of one of the first outgoing light a and the second outgoing light b (optical deflection step).

Further, when stopping the optical deflection operation of the optical deflection device 1, the application of an ac voltage between the pair of electrodes 7a and 7b is stopped. When stopping the application of an ac voltage between the pair of electrodes 7a and 7b, the frequency of an ac voltage applied between the pair of electrodes 7a and 7b by the first power source 8 is set to a higher frequency than the deflection frequency, and the ac voltage having the higher frequency than the deflection frequency is applied between the pair of electrodes 7a and 7b (application stop step). Here, one of the functions of stop process means is realized.

According to this embodiment, the optical deflection operation is performed by switching the direction of an electric field formed in the liquid crystal layer 6 in the chiral smectic C phase through applying an ac voltage of the deflection frequency with respect to the pair of electrodes 7a and 7b. Thus, even with the optical deflection element 5 having the simplified construction, it is possible to speed up the optical deflection operation by using the spontaneous polarization of the liquid crystal molecules 6a in the chiral smectic C phase.

Also, it was ascertained that, according to this embodiment, the generation of a clouded part due to repeated use could be controlled.

In the following, the mechanism of controlling the occurrence of a clouded part due to repeated use is considered.

First, in the optical deflection device 1, the orientation state of the liquid crystal molecules 6a in the liquid crystal layer 6 is greatly disturbed at the moment when the tilt angle direction of the ferroelectric liquid crystal in the smectic C phase is reversed by the reversing of the electric field vector of an electric field occurring in the liquid crystal layer 6 in the two directions: the first electric field direction A and the second electric field direction B. Hereinafter, the disturbance of the perpendicular orientation state of the liquid crystal molecules 6a and a part in which the perpendicular orientation state of the liquid crystal molecules 6a is disturbed are simply referred to as "alignment defect". The alignment defect in the liquid crystal layer 6 tends to occur when the light path deflection operation is repeatedly performed for a long time. The occurrence of the alignment defect generates a clouded part due to light scattering in the liquid crystal layer 6.

Figure 4:
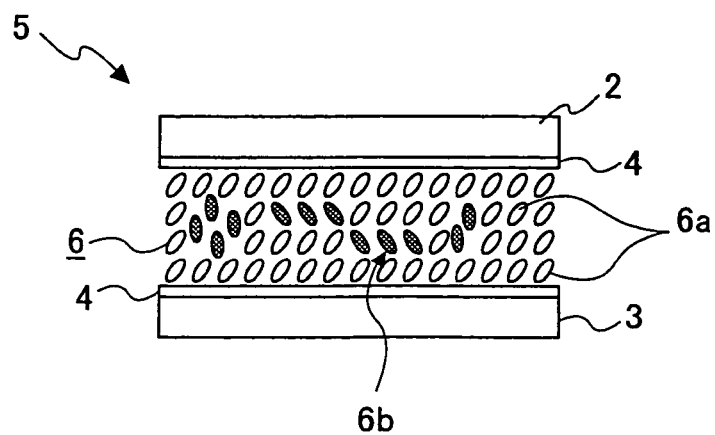
FIG. 4 is a side elevational view for explaining disturbance of the orientation state of the liquid crystal molecules in the liquid crystal layer.

It is considered that white turbidity is affected by factors such as the flowability and electric field response of a liquid crystal material, and an external electric field distribution. Also, it is considered that white turbidity is caused by the formation of minute domains 6b having different orientation directions due to the disturbance of the orientation state of the liquid crystal molecules 6a in the liquid crystal layer 6 as shown in FIG. 4. The formation of the minute domains 6b is considered to be caused by repeated and continuous light path deflection operations of the liquid crystal molecules 6b in the vicinity of the central region of the thickness direction of the liquid crystal layer 6, where the regulatory power of the orientation film 4 is weak. The alignment defect of the liquid crystal molecules 6a is generated in a thin line manner from the place where the orientation state of the liquid crystal molecules 6a tends to be disturbed and electric field unevenness is apt to occur, such as the vicinities of the electrodes 7a and 7b and the central region of the thickness direction of the liquid crystal layer 6. The thin line-like alignment defect is fixed if the optical deflection operation is stopped in the state where the alignment defect begins to grow up.

Although the alignment defect of the liquid crystal molecules 6a in the liquid crystal layer 6 causes light scattering as described above, when the region is small or thin, it is regarded that there is practically no problem.

However, the growth of the alignment defect of the liquid crystal molecules 6a in the liquid crystal layer 6 results in an obvious clouded state. The white turbidity is developed such that the thin line grows up in a swirling manner since the optical deflection operation is repeatedly performed for a long time under the state where the thin line-like alignment defect is generated. Since the perpendicular orientation state of the liquid crystal molecules 6a is disturbed in the clouded part, compared with a conoscope image found in a general perpendicular orientation state, an obviously unclear conoscope image is found, and a conoscope image is not even found in some cases.

The thin line-like alignment defect is fixed by stopping the optical deflection operation in a state where the growth begins. The white turbidity grows up while having the fixed alignment defect as the core when the optical deflection operation is started again. Accordingly, it is surmised that preventing the thin line-like alignment defect from being fixed in the early stage of the generation is effective to avoid the generation of white turbidity (alignment defect).

With the optical deflection device 1 according to this embodiment, when stopping the optical deflection operation of the optical deflection device 1, by applying an ac voltage of a higher frequency than the deflection frequency between the pair of electrodes 7a and 7b before stopping the optical deflection operation by the first power source 8, it is possible to eliminate the thin line-like alignment defect that is slightly generated in the vicinity of the electrodes 7a and 7b.

The mechanism of elimination of the thin line-like alignment defect is not clear. However, it is possible to consider the mechanism of elimination of the thin line-like alignment defect as follows.

Before stopping the optical deflection operation, by applying between the pair of electrodes 7a and 7b an ac voltage of a higher frequency than the driving frequency of the optical deflection operation, an electric field switched with a shorter cycle than the switching cycle of an electric field that acts in the optical deflection operation operated by applying an ac voltage of the deflection frequency is formed in the liquid crystal layer 6. Consequently, the liquid crystal molecules 6a in the liquid crystal layer 6 are maintained to be more relatively mobile than in the optical deflection operation. On the other hand, practically, the actual switching motion of the liquid crystal molecules 6a becomes small, since the response time of the liquid crystal molecules 6a corresponding to the direction of the electric field formed in the liquid crystal layer 6 does not catch up with the switching time of the electric field direction. Thus, the liquid crystal molecules 6a are slightly oscillated in a state near the perpendicular orientation state. As a result, it is surmised that an orientation control force in the perpendicular direction of the liquid crystal molecules 6a is exerted on the entire liquid crystal layer 6, and with the orientation control force, the liquid crystal molecules 6a can be easily oriented again to assume the perpendicular orientation state.

In other words, it is considered that, since the thin line-like alignment defect forming a core is less likely to be generated, even when the light path deflection operation is resumed, the growth of white turbidity having a thin line-like alignment defect as the core is less likely to occur, and therefore it is possible to prevent, over the long term, the alignment defect of the liquid crystal molecules 6a from being fixed as a clouded state through repeated use.

According to the above consideration, preferably, the frequency of an ac voltage applied before stopping the optical deflection operation is set comparatively high enough so as to prevent the electric field response of the liquid crystal molecules 6a from sufficiently catching up with the frequency.

In addition, according to the above consideration, it is surmised that, preferably, an ac voltage of a high frequency applied before stopping the optical deflection operation can give slight oscillation to the liquid crystal molecules 6a.

Accordingly, the waveform of the ac voltage having the high frequency may be any of such as a square wave, triangular wave, and sine wave.

Incidentally, there is an image display apparatus (not shown) that displays an image corresponding to image information by arranging in a plural two-dimensional manner pixels capable of controlling ON/OFF of light and controlling ON/OFF of light of each of the pixels in accordance with the image information, though a description thereof will be omitted since it is well known in the art.

The optical deflection device according to this embodiment may be applied to the above-described image display element. In addition, the optical deflection device according to this embodiment may be applied to optical deflection means of an image display apparatus (not shown) that includes: a light source illuminating the image displayed on the image display element; an optical member for observing the image displayed on the image display apparatus and illuminated by the light source; and optical deflection means for varying the light path between the image display element and the optical member for each of a plurality of sub-fields obtained by dividing in time an image display field of the image display element, and that displays by doubling the number of apparent pixels on the image display element, through observing, by the optical member, an image pattern of which display position is shifted by the optical deflection means in accordance with deflection of the light path of each sub-field. Further, it should be noted that, in this embodiment, the optical deflection means of the image display apparatus is referred to as a "pixel shift element", and a deflection operation of an incident light path by this pixel shift element is referred to as pixel shift.

The above-described image display apparatus performs the pixel shift by the pixel shift element while using afterimage phenomena of eyes of human beings. For this reason, the frequency (driving frequency) of a square wave voltage that determines the timing of the pixel shift of each sub-field by the pixel shift element, that is, the switching timing of the electric field of the optical deflection device 1, may be equal to or more than 30 Hz. In order to positively avoid flicker, preferably, the driving frequency of the square wave voltage is set from a hundred to several hundred Hz.

In such an image display apparatus, by applying an ac voltage of a higher frequency than the driving frequency of the pixel shift operation during a given length of time before stopping the pixel shift operation, it is possible to eliminate the thin line-like alignment defect that is slightly generated in the vicinity of the electrodes and control the generation of white turbidity caused by the defect of perpendicular orientation.

Next, referring to FIG. 5, a description will be given of a second embodiment of the present invention. This embodiment shows an example where the present invention is applied to an optical deflection device. It should be noted that those parts that are the same as those corresponding parts in the first embodiment are designated by the same reference numerals, and a description thereof will be omitted. The same applies to the following embodiments.

Figure 5A:
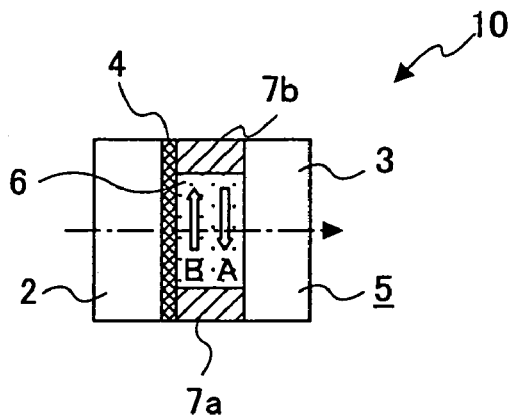
FIGS. 5A, 5B, and 5C are a plan view, a front cross-sectional view, and a side elevational view, respectively, showing in principle a construction example of the optical deflection device according to a second embodiment of the present invention.
Figure 5B:
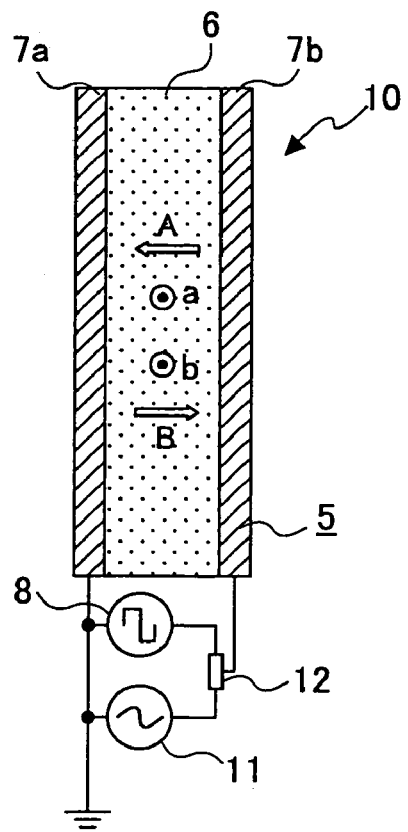
Figure 5C:
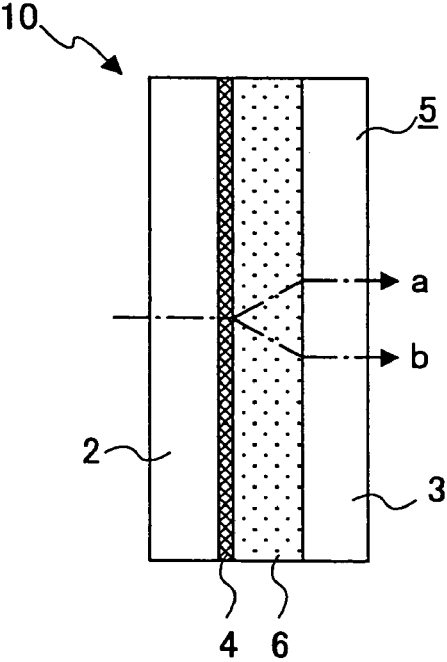

FIGS. 5A, 5B and 5C show in principle a construction example of an optical deflection device according to this embodiment. FIG. 5A is a plan view, FIG. 5B is a cross-sectional front view, and FIG. 5C is a side elevational view of the optical deflection device. An optical deflection device 10 according to this embodiment is provided with a second power source 11 that functions as the second voltage application means for applying between the pair of electrodes 7a and 7b an ac voltage of a higher frequency than the deflection frequency of the ac voltage applied by the first power source 8, in addition to the first power source 8 as the first voltage application means for applying an ac voltage of the deflection frequency between the pair of electrodes 7a and 7b so as to drive the optical deflection element 5. The first and second power sources 8 and 11, respectively, are switched by a switch 12 such that one of the first and second power sources 8 and 11, respectively, is effective.

The first power source 8 applies between the pair of electrodes 7a and 7b an ac voltage of which deflection frequency is set to the order of several hundred Hz. The first power source 8 applies an ac voltage of the driving frequency of the optical deflection operation (pixel shift). The first power source 8 applies an ac voltage having the waveform as shown in FIG. 3, for example.

The second power source 11 applies between the pair of electrodes 7a and 7b an ac voltage of a higher frequency than the deflection frequency causing the optical deflection element 5 to perform the optical deflection operation (pixel shift), which is several hundred Hz. More specifically, the second power source 11 applies, to the electrodes 7a and 7b, an ac voltage having a period of a half cycle shorter than the response time of the liquid crystal molecules 6a. Application of such a high frequency voltage prevents optical deflection phenomena of incident light on the optical deflection element 5 from occurring. Preferably, the frequency of an ac voltage applied between the pair of electrodes 7a and 7b is set such that the response time of the liquid crystal molecules 6a does not catch up with the switching time of the electric field direction, which is equal to or more than 1 kHz. The response time of the liquid crystal molecules 6a in the liquid crystal layer 6 varies according to such as the electric characteristics, viscosity, and kind of the liquid crystal material. Thus, the frequency that does not produce the optical deflection phenomenon varies depending on the liquid crystal material forming the liquid crystal layer 6. Hence, the optimum frequency of the second power source 11 may be properly set in accordance with such as the electric characteristics and viscosity of the liquid crystal material, based on experiments, for example.

Additionally, the second power source 11 applies an ac voltage having a voltage value greater than the voltage value of the ac voltage of the deflection frequency applied by the first power source 8. The second power source 11 applies an ac voltage having the voltage value with which the liquid crystal molecules 6 adequately move in the liquid crystal layer 6. The voltage value with which the liquid crystal molecules 6 in the liquid crystal layer 6 adequately move varies according to the element construction. However, it is preferable that the field intensity be of the order of $1 \times 10^5$ V/m.

Moreover, the waveform of an ac voltage applied by the second power source 11 may be the square wave as shown in FIG. 3. However, the square wave is not a limitation, and the waveform may be such as a triangular wave and a sine wave.

In such a construction, on the occasion of the optical deflection operation of the optical deflection device 10, an ac voltage of the deflection frequency on the order of several hundred Hz is applied between the pair of electrodes 7a and 7b by the first power source 8. Thus, the optical deflection direction is switched with the switching timing of several hundred Hz so that an incident light on the liquid crystal layer 6 takes the light path of one of the first outgoing light a and the second outgoing light b (optical deflection step).

Further, when stopping the optical deflection operation of the optical deflection device 10, the application of a voltage to the pair of electrodes 7a and 7b is stopped. When stopping the application of the voltage to the pair of electrodes 7a and 7b, the second power source 11 applies between the pair of electrodes 7a and 7b an ac voltage of a higher frequency than the deflection frequency (application stop step). Here, one of the functions of the stop processing means is realized. Hence, an ac voltage having a higher frequency than the voltage applied by the first power source 8 is applied to the liquid crystal layer 6.

According to the above consideration, through applying, by the second power source 11, an ac voltage of a higher frequency than the frequency of the ac voltage applied by the first power source 8, the response time of the liquid crystal molecules 6a does not catch up with the switching time of the electric field direction, and the orientation control force in the substantially perpendicular direction is exerted on the liquid crystal layer 6. Thus, it is possible to simplify the orientation of the liquid crystal molecules 6a in the substantially perpendicular direction.

Accordingly, it is possible to easily make the liquid crystal molecules 6a become oriented again to assume the perpendicular orientation state by more effectively exerting the orientation control force on the entire liquid crystal layer 6. Hence, it is possible to align in a short period of time the disturbed liquid crystal molecules in the liquid crystal layer 6 to assume the substantially perpendicular orientation state with respect to the boards 2 and 3.

Additionally, the voltage value of an ac voltage applied by the second power source 11 is set to be greater than the voltage value of an ac voltage applied by the first power source 8. Thus, an electric field larger than that in the optical deflection operation is formed with respect to the liquid crystal layer 6. Hence, the force oscillating the liquid crystal molecules 6a very slightly becomes great, and thus it is possible to more positively exert, on the liquid crystal molecules 6, the orientation control force in the perpendicular direction. Accordingly, it is possible to more positively align the liquid crystal molecules 6a to assume the substantially perpendicular orientation state with respect to the boards 2 and 3.

Next, referring to FIGS. 6A, 6B, 6C and 7, a description will be given of a third embodiment of the present invention. This embodiment shows an example where the present invention is applied to an optical deflection device.

Figure 6A:
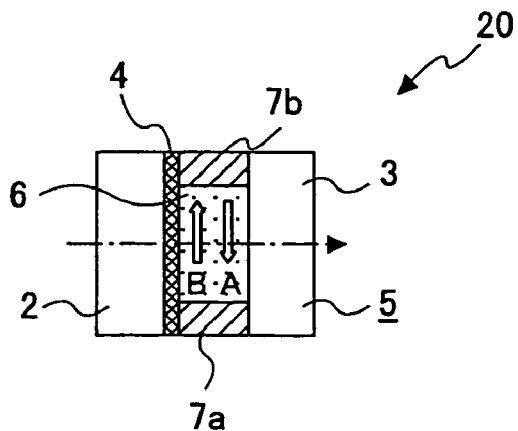
FIGS. 6A, 6B, and 6C are a plan view, a front cross-sectional view, and a side elevational view, respectively, showing in principle a construction example of the optical deflection device according to a third embodiment of the present invention.
Figure 6B:
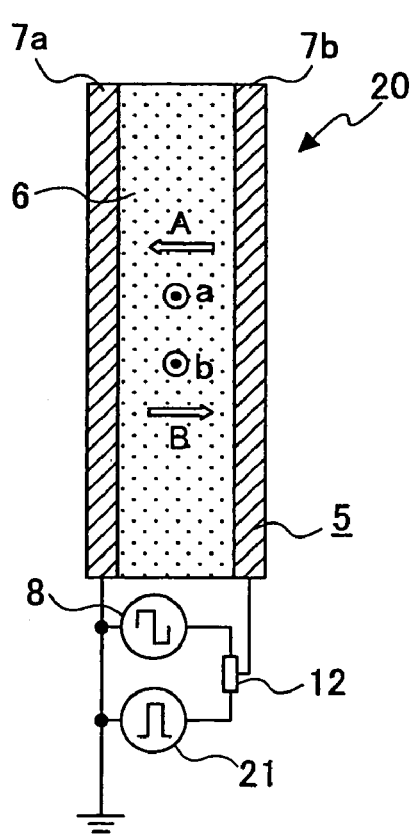
Figure 6C:
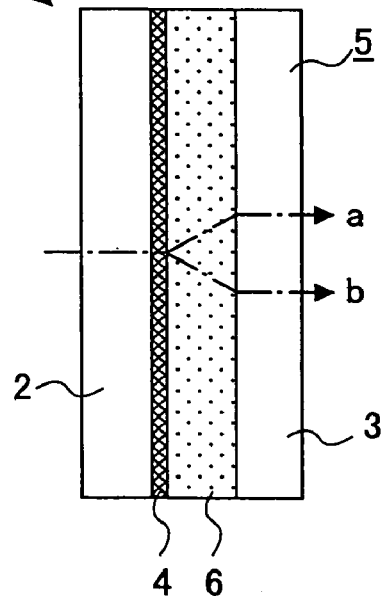

FIGS. 6A, 6B and 6C show in principle a construction example of an optical deflection device according to this embodiment. FIG. 6A is a plan view, FIG. 6B is a front cross-sectional view, and FIG. 6C is a side elevational view of the optical deflection device. An optical deflection device 20 according to this embodiment is provided with a third power source 21 that functions as third voltage application means for applying a pulsed dc voltage to the pair of electrodes 7a and 7b, in addition to the first power source 8 as the first voltage application means for applying an ac voltage of the deflection frequency to the pair of electrodes 7a and 7b so as to drive the optical deflection element 5. The first and third power sources 8 and 21, respectively, are switched by the switch 12 such that one of the first and third power sources 8 and 21, respectively, is effective.

As described above, the ac voltage applied by the first power source 8 is in the square wave as shown in FIG. 3, and the deflection frequency thereof is set on the order of several hundred Hz.

Figure 7:
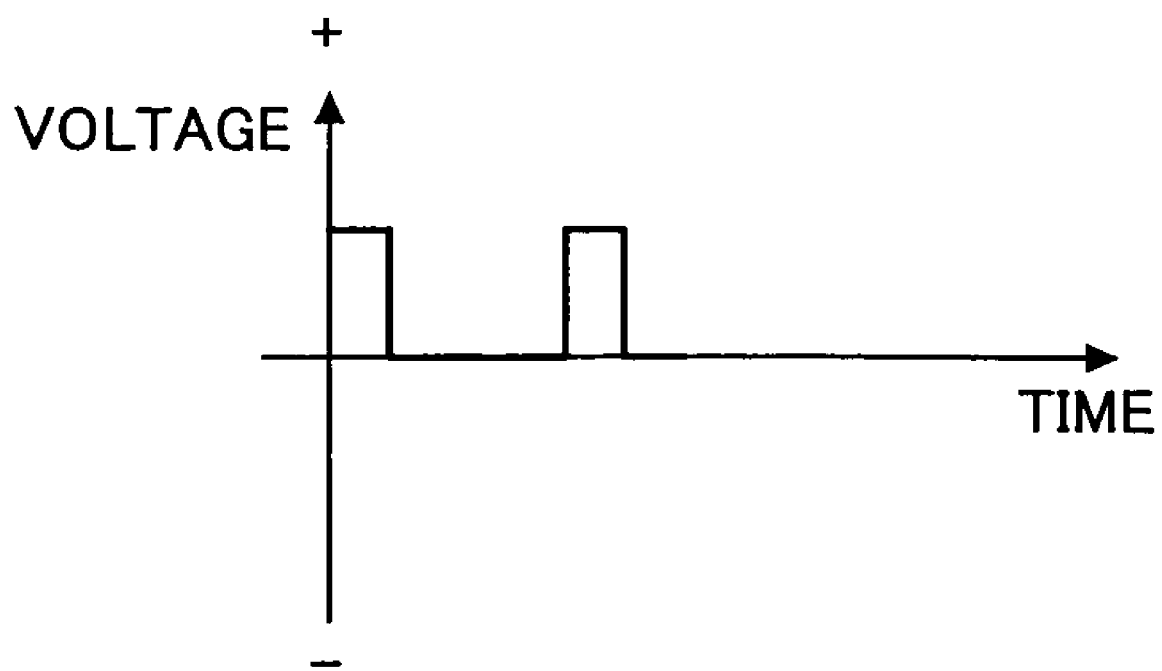
FIG. 7 is a timing diagram showing the waveform of a dc voltage applied between the pair of electrodes.

The third power source 21 intermittently applies a pulsed dc voltage to the liquid crystal layer 6 when stopping the optical deflection operation that will be described later. The dc voltage applied by the third power source 21 is in a pulsed waveform as shown in FIG. 7. Although depending on the construction of the optical deflection element 5, preferably, the intermittent application frequency is on the order of 0.1 to 1 Hz.

In addition, the third power source 21 applies a dc voltage of which voltage value is set higher than the voltage value of the ac voltage applied by the first power source 8. Although depending on the construction of the optical deflection element 5, preferably, the optimum voltage value of the third power source 21 is set equal to or more than $1 \times 10^5$ V/m.

In such a construction, on the occasion of the optical deflection operation of the optical deflection device 20, an ac voltage of the deflection frequency on the order of several hundred Hz is applied between the pair of electrodes 7a and 7b by the first power source 8. Thus, the optical deflection direction is switched with the switching timing of several hundred Hz so that an incident light on the liquid crystal layer 6 takes the light path of one of the first outgoing light a and the second outgoing light b (optical deflection step).

Further, when stopping the optical deflection operation of the optical deflection device 20, the application of the ac voltage to the pair of electrodes 7a and 7b is stopped. When stopping the application of the voltage to the pair of electrodes 7a and 7b, following the application of the ac voltage of the deflection frequency by the first power source 8, the third power source 21 intermittently applies the pulsed dc voltage between the pair of electrodes 7a and 7b (application stop step). Here, one of the functions of the stop process means is realized.

Incidentally, even in a case where white turbidity, in which the orientation state is disturbed, regionally occurs in the liquid crystal layer 6, and the liquid crystal molecules 6a in the white turbidity are brought back to the perpendicular orientation state by, for example, applying a high frequency voltage as in the above-described embodiments, in some cases, the interface portion of the white turbidity and a normal orientation part bears the mark (is visible).

It was ascertained that, according to this embodiment, before stopping application of a voltage, by intermittently applying a pulsed dc voltage between the pair of electrodes 7a and 7b by the third power source 21, and thus causing an electric field in the first electric field direction A to intermittently act on the liquid crystal layer 6, occurrence of white turbidity due to alignment defect of the liquid crystal molecules 6a was controlled, and the interface part of the white turbidity and a normal orientation part did not bear the mark.

Here, the mechanism of controlling occurrence of alignment defect of the liquid crystal molecules 6a is considered. The mechanism of white turbidity occurrence prevention through intermittently applying a pulsed dc voltage between the pair of electrodes 7a and 7b before stopping the application of the voltage is not clear. However, the mechanism may be surmised as follows. That is, an electric field in the first electric field direction A is intermittently formed in the liquid crystal layer 6 by intermittently applying a pulsed dc voltage between the pair of electrodes 7a and 7b. It is surmised that, on this occasion, at the moment of ON/OFF of the pulsed dc voltage, the orientation of the liquid crystal molecules 6a in the liquid crystal layer 6 is disturbed in a wave manner from the vicinities of the electrodes 7a and 7b, and the disturbance is propagated to the adjacent liquid crystal molecules 6a. Thus, the liquid crystal molecules 6a are intermittently oscillated throughout the entire liquid crystal layer 6. This oscillation temporarily disturbs the orientation state of the liquid crystal molecules 6a in the entire liquid crystal layer 6. Hence, even when the orientation state of the liquid crystal molecules 6a is regionally disturbed in the liquid crystal layer 6, the mark borne in the interface of a part where the orientation state is disturbed and a part where the orientation state is not disturbed is eliminated. The liquid crystal molecules 6a possess the property of spontaneously reorienting themselves when the orientation state is disturbed. Accordingly, it is surmised that the liquid crystal molecules 6a may be oriented substantially perpendicularly throughout the liquid crystal layer 6 by temporarily disturbing the orientation state of the liquid crystal molecules 6a in the entire liquid crystal layer 6 so as to cause the liquid crystal molecules 6a throughout the liquid crystal layer 6 to effectively perform spontaneous reorientation.

It should be noted that such an effect is small if a dc voltage is continuously applied for a long time, or an ac voltage of a frequency on the order of the deflection frequency is applied. This also supports the importance of the wave-like movement that the disturbance of the orientation state occurring in switching the electric field direction propagates throughout the liquid crystal layer 6, and then reorientation is performed.

According to this embodiment, even when a local alignment defect occurs due to the optical deflection operation of the optical deflection element 5, generation of white turbidity caused by the occurrence of the alignment defect is controlled by preventing the alignment defect from being fixed. Thus, it is possible to provide the optical deflection device 20 having high reliability.

In addition, the third power source 21 applies a dc voltage of a voltage value that is set higher than the voltage value of the ac voltage applied by the first power source 8. For this reason, the liquid crystal molecules 6a in the liquid crystal layer 6 become more mobile at the moment of switching the electric field direction. Accordingly, it is possible to effectively prevent the interface part of the alignment defect part and a normal orientation part from bearing the mark, and to positively and uniformly reorient the liquid crystal molecules 6a in a shorter period of time.

Next, referring to FIGS. 8A, 8B and 8C, a description will be given of a fourth embodiment of the present invention.

Figure 8A:
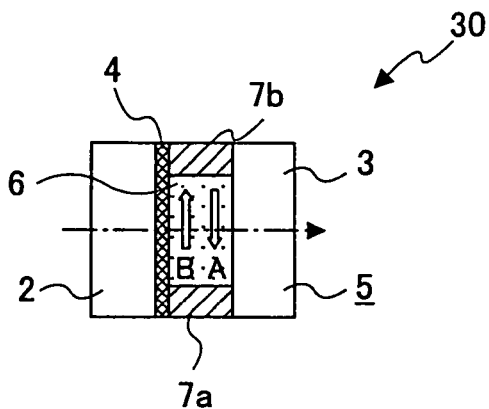
FIGS. 8A, 8B, and 8C are a plan view, a front cross-sectional view, and a side elevational view, respectively, showing in principle a construction example of the optical deflection device according to a fourth embodiment of the present invention.
Figure 8B:
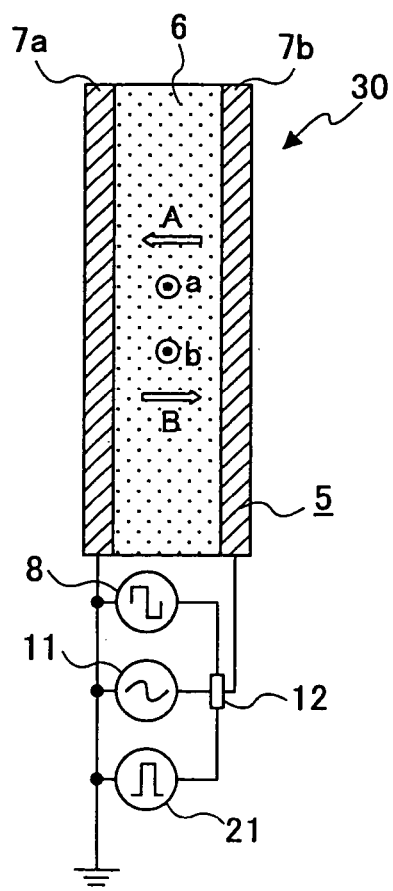
Figure 8C:
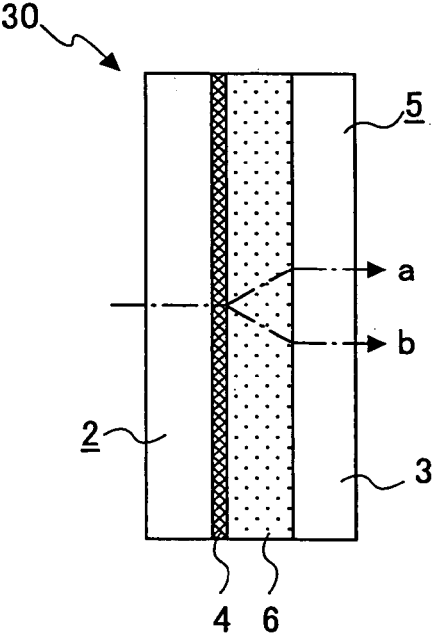

FIGS. 8A, 8B and 8C show in principle a construction example of an optical deflection device according to this embodiment. FIG. 8A is a plan view, FIG. 8B is a front cross-sectional view, and FIG. 8C is a side elevational view of the optical deflection device. An optical deflection device 30 according to this embodiment includes the first power source 8 that functions as the first voltage application means for applying an ac voltage of the driving frequency to the pair of electrodes 7a and 7b so as to drive the optical deflection element 5, the second power source 11 that functions as the second voltage application means for applying an ac voltage of a higher frequency than the driving frequency of the ac voltage applied by the first power source 8 to the pair of electrodes 7a and 7b, and the third power source 31 that functions as the third voltage application means for intermittently applying a pulsed dc voltage between the pair of electrodes 7a and 7b. The first, second, and third power sources 8, 11, and 21, respectively, are switched by the switch 12 such that one of the first, second, and third power sources 8, 11, and 21, respectively, is effective.

In such a construction, on the occasion of the optical deflection operation of the optical deflection device 30, an ac voltage of the driving frequency on the order of several hundred Hz is applied between the pair of electrodes 7a and 7b by the first power source 8. Thus, the optical deflection direction is switched with the switching timing of several hundred Hz so that an incident light on the liquid crystal layer 6 takes the light path of one of the first outgoing light a and the second outgoing light b (optical deflection step).

In addition, when stopping the optical deflection operation of the optical deflection device 30, application of the voltage to the pair of electrodes 7a and 7b is stopped. When stopping the application of the voltage to the pair of electrodes 7a and 7b, following the application of the ac voltage of the deflection frequency, the third power source 21 intermittently applies the pulsed dc voltage between the pair of electrodes 7a and 7b (orientation cancel step). Thereafter, the second power source 11 applies between the pair of electrodes 7a and 7b the ac voltage of the higher frequency than the frequency of the deflection direction switching operation (application stop step). Here, one of the functions of the stop process means is realized.

On this occasion, an ac voltage having a higher frequency than the deflection frequency may be applied such that the second power source 11 applies an ac voltage of a lower frequency than the deflection frequency, and thereafter increases the frequency of the ac voltage continuously or in stages.

Additionally, on this occasion, the second power source 11 may apply an ac voltage having a higher voltage value than the voltage value applied by the first power source 8.

According to this embodiment, it was ascertained that, when stopping the application of the voltage to the pair of electrodes 7a and 7b, following the application of the ac voltage of the deflection frequency, by intermittently applying the pulsed dc voltage to the pair of electrodes 7a and 7b by the third power source 21, applying the ac voltage of the higher frequency than the frequency of the deflection direction switching operation between the pair of electrodes 7a and 7b by the second power source 11, and thereafter stopping the application of the voltage to the electrodes, the generation of white turbidity was controlled, and the interface of the white turbidity and the normal part did not bear the mark.

In the following, the mechanism of white turbidity occurrence prevention is considered. The mechanism of occurrence of white turbidity is not clear. However, as described above, by intermittently applying the pulsed dc voltage between the pair of electrodes 7a and 7b by the third power source 21 after applying the ac voltage of the deflection frequency by the first power source 8, the orientation of the liquid crystal molecules 6a in the entire liquid crystal layer 6 is disturbed, and thus the mark of the interface of the normal orientation part and the alignment defect part is eliminated. In this state, when the second power source 11 applies between the pair of electrodes 7a and 7b the ac voltage of the higher frequency than the driving frequency so as to apply the ac voltage having the shorter cycle than the electric field direction switching cycle in the optical deflection operation, the liquid crystal molecules 6a in the liquid crystal layer 6 are maintained to be comparatively mobile, while the response time does not adequately catch up with the switching of the electric field direction. Consequently, the liquid crystal molecules 6a are slightly oscillated near the perpendicular orientation state.

By the way, it relatively takes time for the liquid crystal molecules 6a of which orientation state is disturbed throughout the liquid crystal layer 6 to perfectly and spontaneously perform reorientation.

In this embodiment, after disturbing the orientation of the liquid crystal molecules 6a in the entire liquid crystal layer 6, the liquid crystal molecules 6a are slightly oscillated near the perpendicular orientation state while being maintained to be comparatively mobile. Hence, compared with the case where the reorientation operation of the liquid crystal molecules 6a is accelerated so as to cause the liquid crystal molecules 6a to perfectly and spontaneously perform reorientation, it is possible to positively cause the liquid crystal molecules 6a to perform reorientation in a short period of time.

Additionally, in this embodiment, the high frequency ac voltage is applied after the application of the pulsed dc voltage. Thus, the reorientation process thereafter of the entire liquid crystal layer 6 is speeded. Hence, compared with the case where a high frequency ac voltage is applied without applying a pulsed dc voltage, it is possible to positively cause the liquid crystal molecules 6a to perform reorientation throughout the liquid crystal layer 6 in a short period of time.

Next, a description will be given of a fifth embodiment of the present invention. The present invention may be applied to the above-described various optical deflection devices 1, 10, 20, and 30, for example. The first power source 8 includes a function of varying the voltage value, and functions as fourth voltage application means.

When stopping the optical deflection operation of the optical deflection device 1 (10, 20, or 30), the voltage value of the ac voltage applied between the pair of electrodes 7a and 7b is continuously decreased and stopped by the first power source 8 (application stop step). Here, one of the functions of the stop process means is realized.

Further, the voltage value of the ac voltage applied between the pair of electrodes 7a and 7b by the first power source 8 is not limited to be continuously decreased, but may be decreased intermittently.

Hence, when stopping the application of the voltage, as the applied voltage value becomes smaller than the voltage for a saturation electric field (the voltage value for applying a saturation electric field to a liquid crystal) of switching of the liquid crystal molecules 6a through decreasing continuously or in stages the voltage value of the ac voltage of the deflection frequency applied between the pair of electrodes 7a and 7b, and stopping the application at a voltage value smaller than the voltage value that can switch the optical deflection direction, the liquid crystal molecules 6a stops close to the perpendicular orientation state. Thus, it is possible to prevent disturbance of the liquid crystal molecules 6a that occurs when the optical deflection operation is stopped.

It should be noted that, in this embodiment, the voltage value smaller than the voltage for the saturation electric field of switching of the liquid crystal molecules 6a includes a state where the voltage value is zero.

Additionally, when performing the application stop step in the above-described embodiment, in a case where the second power source 11 applies an ac voltage of a voltage value higher than the voltage value applied by the first power source 8, electrostatic energy exerted on the liquid crystal molecules becomes large, and thus a force to orient the liquid crystal molecules in the perpendicular direction becomes large. Hence, even in a case where a part having a tendency to form white turbidity is generated, since the orientation state is disturbed by the optical deflection operation of the optical deflection element, it is possible to bring the liquid crystal molecules to the original perpendicular orientation state.

Next, a description will be given of a sixth embodiment of the present invention. This embodiment is different from the above-described various embodiments in that the dielectric anisotropy of the liquid crystal layer 6 forming the chiral smectic C phase is negative in a frequency band of an ac voltage having a period of a half cycle shorter than the response time of the liquid crystal molecules 6a.

A description will be given of ferroelectric liquid crystal. There are two kinds of ferroelectric liquid crystal: ferroelectric liquid crystal having positive dielectric anisotropy and ferroelectric crystal having negative dielectric anisotropy. Generally, when a high frequency electric field is applied to the liquid crystal layer 6, the liquid crystal molecules 6a in the liquid crystal layer 6 attempt to orient themselves in such a direction that electrostatic energy is minimized.

Hence, for example, when an ac voltage is applied in a substantially parallel direction to the liquid crystal layer 6 of the optical deflection element 5 shown in FIG. 1, the liquid crystal molecules 6a of a liquid crystal material having positive dielectric anisotropy attempt to orient themselves in a direction parallel to the applied electric field direction. On the contrary, the liquid crystal molecules 6a of a liquid crystal material having negative dielectric anisotropy attempt to orient themselves in a direction perpendicular to the applied electric field direction.

In such a construction, on the occasion of the optical deflection operation of the optical deflection device 1, the ac voltage of the driving frequency on the order of several hundred Hz is applied between the pair of electrodes 7a and 7b by the first power source 8. Thus, the optical deflection direction is switched with the switching timing of several hundred Hz so that an incident light on the liquid crystal layer 6 takes the light path of one of the first outgoing light a and the second outgoing light b (optical deflection step).

In addition, when stopping the optical deflection operation of the optical deflection device 1, the application of the voltage to the pair of electrodes 7a and 7b is stopped. When stopping the application of the voltage to the pair of electrodes 7a and 7b, an ac voltage of a higher frequency than the deflection frequency is applied between the pair of electrodes 7a and 7b after applying the ac voltage of the deflection frequency by the first power source 8 (application stop step). Here, one of the functions of the stop process means is realized.

The liquid crystal layer 6 in this embodiment is formed by a liquid crystal material having negative dielectric anisotropy. For this reason, when a high frequency electric field is applied in a substantially parallel direction to the liquid crystal layer 6 so as to orient the liquid crystal molecules 6a in such a direction that the electrostatic energy is minimized, as a result, the liquid crystal molecules 6a attempt to assume the perpendicular orientation state with respect to the layer direction of the liquid crystal layer 6. Hence, it is possible to positively orient the liquid crystal molecules 6a to assume the perpendicular orientation state by exerting electrostatic energy in addition to the orientation control force of the orientation film 4.

Additionally, the electrostatic energy as well as the orientation control force of the orientation film 4 may be exerted every time a voltage is applied between the pair of electrodes 7a and 7b. Therefore, it is possible to control occurrence of alignment defect caused by the deflection direction switching operation, speed up the light path deflection operation of the optical deflection element 5 having a simplified construction, and control occurrence of alignment deflect due to repeated use. Thus, it is possible to improve reliability of the optical deflection device.

Next, a description will be given of a seventh embodiment of the present invention. The present invention may be applied to, for example, the optical deflection device 1 shown in FIGS. 1A through 1C. Thus, in this embodiment, an example is shown where the present invention is applied to the optical deflection device 1 shown in FIGS. 1A through 1C.

Also in this embodiment, the first power source 8 applies between the pair of electrodes 7*a* and 7*b* an ac voltage having a driving frequency on the order of several hundred Hz. The first power source 8 is constructed such that two kinds of ac voltages can be applied between the pair of electrodes 7*a* and 7*b*: an ac voltage of the deflection frequency switching the optical deflection direction of the optical deflection element 5, and an ac voltage of a frequency that is different from the deflection frequency. In this embodiment, the first voltage application means is realized by the first power source 8.

With such a construction, on the occasion of the optical deflection operation of the optical deflection device 1, an ac voltage of the deflection frequency on the order of several hundred Hz is applied between the pair of electrodes 7*a* and 7*b* by the first power source 8. Thus, the optical deflection direction is switched with the switching timing of several hundred Hz so that an incident light on the optical deflection element 5 takes the light path of one of the first outgoing light a and the second outgoing light b (optical deflection step).

According to this embodiment, the optical deflection operation is performed by switching the electric field direction formed in the liquid crystal layer 6 in the chiral smectic C phase through applying an ac voltage of the deflection frequency. Accordingly, even with the optical deflection element 5 having a simplified construction, it is possible to speed up the optical deflection operation by using spontaneous polarization of the liquid crystal molecules 6*a* in the chiral smectic C phase.

In this embodiment, when starting the optical deflection operation, the frequency of an ac voltage applied between the pair of electrodes 7*a* and 7*b* is set higher than the deflection frequency, and the ac voltage having the higher frequency than the deflection frequency is applied between the pair of electrodes 7*a* and 7*b* (application start step). Here, one of functions of start process means is realized. Thus, an ac voltage having a higher frequency than the voltage applied by the first power source 8 is applied to the liquid crystal layer 6.

By the way, it is conceivable that alignment defect occurs due to suspension of the operation for a long time or another factor even in an optical deflection element suspended in a state without alignment defect.

For example, in a case where a liquid crystal material operating at a very low voltage is used, the influence of static electricity may contribute to alignment defect. In fact, it is possible to ascertain the flow of liquid crystal molecules caused by static electricity. That is, even while the operation is suspended, it is to be expected that the perpendicular state of liquid crystal molecules is varied.

Additionally, it is also conceivable that minute deformation of a board caused by temperature variation changes the pressure distribution in the liquid crystal layer, and thus alignment defect occurs.

As described above, though alignment defect of the liquid crystal molecules 6*a* in the liquid crystal layer 6 causes light scattering, it is considered that there is no problem when the region thereof is small or thin. However, when the optical deflection operation is started with a nucleus of alignment defect, alignment defect of the liquid crystal molecules 6*a* increases to produce an obvious white turbidity. Thus, it is surmised that eliminating alignment defect before starting the optical deflection operation is effective in preventing white turbidity from occurring.

With the optical deflection device 1 according to this embodiment, when starting the optical deflection operation of the optical deflection device 1, an ac voltage of a higher frequency than the deflection frequency is applied between the pair of electrodes 7*a* and 7*b* before starting the optical deflection operation by the first power source 8. Hence, it is possible to eliminate a thin line-like alignment defect that slightly occurs in the vicinities of electrodes 7*a* and 7*b*.

By applying an ac voltage of a higher frequency than the driving frequency of the optical deflection operation between the pair of electrodes 7*a* and 7*b* by the first power source 8 before starting the optical deflection operation, an electric field switched with a shorter cycle than the switching cycle of an electric field applied in the optical deflection operation that is operated by applying an ac voltage of the deflection frequency is formed in the liquid crystal layer 6. Hence, the liquid crystal molecules 6*a* in the liquid crystal layer 6 are maintained to be relatively more mobile than in the optical deflection operation. On the other hand, actually, the response of the liquid crystal molecules 6*a* corresponding to the direction of the electric field formed in the liquid crystal layer 6 does not sufficiently catch up with the switching of the electric field direction. Thus, the actual switching motion of the liquid crystal molecules 6*a* is small. Accordingly, it is surmised that the liquid crystal molecules 6*a* are slightly oscillated near the perpendicular orientation state, and as a result, an orientation control force in the perpendicular direction for the liquid crystal molecules 6*a* is exerted on the entire liquid crystal layer 6, and with this orientation control force, it is possible to easily reorient the liquid crystal molecules 6*a* to assume the perpendicular orientation state.

In other words, it is considered that alignment defect of the liquid crystal molecules 6*a* can be prevented from being fixed for a long time as white turbidity by repeated use, since a thin line-like alignment defect serving as a nucleus seldom occurs, and thus white turbidity having the thin line-like alignment defect as the nucleus seldom occurs even when the light path deflection operation is started (or resumed).

According to the above consideration, preferably, the frequency of an ac voltage applied before starting the optical deflection operation be relatively high such that the response of the liquid crystal molecules 6*a* does not sufficiently catch up with the switching of an electric field.

Further, according to the above consideration, it is conceived that the waveform of an ac voltage of a high frequency applied before starting the optical deflection operation may be any shape as long as slight oscillation can be given to the liquid crystal molecules 6*a*. Thus, the waveform may be any of such as a square wave, a triangular wave, and a sine wave.

By the way, the optical deflection device 1 of this embodiment may also be applied to optical deflection means of an image display apparatus (not shown) that includes: an image display element (not shown), a light source (not shown) illuminating an image displayed on the image display element; an optical member (not shown) for observing the image displayed on the image display apparatus and illuminated by the light source; and optical deflection means (not shown) for varying the light path between the image display element and the optical member for each of a plurality of sub-fields obtained by dividing in time an image display field of the image display element, and that displays by doubling the number of apparent pixels on the image display element, through observing, by the optical member, an image pattern of which display position is shifted by the optical deflection means in accordance with deflection of the light path of each sub-field.

The application start step in starting the optical deflection operation may be performed by the optical deflection devices 1, 20, and 30 according to the above-described various embodiments that perform the application stop step when stopping the optical deflection operation.

Next, a description will be given of an eighth embodiment of the present invention. The present invention may be applied to, for example, the optical deflection device 10 shown in FIGS. 5A through 5C. Thus, in this embodiment, an example is shown where the present invention is applied to the optical deflection device 10 shown in FIGS. 5A through 5C.

The first power source 8 in this embodiment applies an ac voltage of the driving frequency on the order of several hundred Hz between the pair of electrodes 7a and 7b and functions as the first voltage application means.

The second power source 11 applies between the pair of electrodes 7a and 7b an ac voltage of a higher frequency than the deflection frequency of the ac voltage applied by the first power source 8, that is, the deflection frequency of several hundred Hz that causes the optical deflection element 5 to perform the optical deflection operation (pixel shift), and functions as the second voltage application means. The voltage applied by the second power source 11 is set higher (greater) than the voltage value applied by the first power source 8. In addition, the second power source 11 applies between the electrodes 7a and 7b an ac voltage having a period of a half cycle shorter than the response time of the liquid crystal molecules 6a.

Additionally, the second power source 11 applies an ac voltage of a higher voltage value than the voltage value of the ac voltage of the deflection frequency applied by the first power source 8. The second power source 11 applies an ac voltage of a voltage value at which the liquid crystal molecules 6a in the liquid crystal layer 6 sufficiently move. Preferably, the voltage value at which the liquid crystal molecules 6a in the liquid crystal layer 6 sufficiently move will be of an electric field intensity on the order of $1 \times 10^5$ V/m, though depending on the element structure.

Moreover, the waveform of the ac voltage applied by the second power source 11 is not limited to the square wave as shown in FIG. 3, but may be such as a triangular wave and a sine wave.

In such a construction, on the occasion of the optical deflection operation of the optical deflection device 10, the first power source 8 applies an ac voltage of the deflection frequency on the order of several hundred Hz between the pair of electrodes 7a and 7b. Thus, the optical deflection direction is switched with the switching timing of several hundred Hz so that an incident light on the liquid crystal layer 6 takes the light path of one of the first outgoing light a and the second outgoing light b (optical deflection step).

In this embodiment, when starting the optical deflection operation, the frequency of an ac voltage applied between the pair of electrodes 7a and 7b is set higher than the deflection frequency, and an ac voltage of a higher frequency than the deflection frequency is applied between the pair of electrodes 7a and 7b (application start step). Here, one of the functions of the start process means is realized. Hence, an ac voltage of a higher frequency than that of the voltage applied by the first power source 8 is applied to the liquid crystal layer 6.

According to the above consideration, when an ac voltage of a higher frequency than the frequency of the ac voltage applied by the first power source 8 is applied by the second power source 11, the response of the liquid crystal molecules 6a does not catch up with the switching of the electric field direction, and an orientation force in a substantially perpendicular direction is exerted on the liquid crystal layer 6. Thus, it is possible to simplify the orientation of the liquid crystal molecules 6a in the substantially perpendicular direction.

Hence, the orientation control force can be more effectively exerted on the entire liquid crystal layer 6, and thereby the liquid crystal molecules 6a can be easily reoriented to assume the perpendicular orientation state. Accordingly, it is possible to align the disturbed liquid crystal molecules 6a in the liquid crystal layer 6 to assume the substantially perpendicular orientation state with respect to the boards 2 and 3 in a shorter period of time.

In addition, since the voltage value applied by the second power source 11 is set higher than the voltage value applied by the first power source 8, an electric field greater than that in the optical deflection operation is formed with respect to the liquid crystal layer 6. Hence, a force oscillating the liquid crystal molecules 6a very slightly is increased, and thus it is possible to more positively exert the orientation control force in the perpendicular direction on the liquid crystal molecules 6a. Accordingly, it is possible to more positively align the liquid crystal molecules 6a to assume the substantially perpendicular orientation state with respect to the boards 2 and 3.

Next, a description will be given of a ninth embodiment of the present invention. The present invention may be applied to, for example, the optical deflection device 20 shown in FIGS. 6A through 6C. Thus, in this embodiment, an example is shown where the present invention is applied to the optical deflection device 20 shown in FIGS. 6A through 6C.

As described above, the ac voltage applied by the first power source 8 is, for example, the square wave as shown in FIG. 3, and the deflection frequency is set on the order of several hundred Hz. In this embodiment, the first power source 8 functions as the first voltage application means.

The third power source 21 intermittently applies a pulsed dc voltage to the liquid crystal layer 6 when starting the optical deflection operation that is described below. The third power source 21 applies a dc voltage having a pulsed waveform as shown in FIG. 7. Preferably, the intermittent application frequency has a cycle on the order of 0.1-1 Hz, though depending on the construction of the optical deflection element 5. In this embodiment, the third power source 21 functions as the third voltage application means.

Also, the third power source 21 applies a dc voltage of a voltage value that is set higher than the voltage value of the ac voltage applied by the first power source 8. Preferably, the optimum voltage value applied by the third power source 21 will be equal to or more than $1 \times 10^5$ V/m, though depending on the construction of the optical deflection element 5.

In such a construction, on the occasion of the optical deflection operation of the optical deflection device 20, the first power source 8 applies an ac voltage of the deflection frequency on the order of several hundred Hz between the pair of electrodes 7a and 7b. Thus, the optical deflection direction is switched with the switching timing of several hundred Hz so that an incident light on the liquid crystal layer 6 takes the light path of one of the first outgoing light a and the second outgoing light b (optical deflection step).

In this embodiment, when starting the optical deflection operation, the third power source 21 intermittently applies a pulsed dc voltage between the pair of electrodes 7a and 7b. Then, subsequently, the first power source 8 applies an ac voltage of the deflection frequency (application start step). Here, one of the functions of the start process means is realized.

According to this embodiment, it was confirmed that occurrence of white turbidity due to alignment defect of the liquid crystal molecules 6a was controlled and the interface of white turbidity and normal orientation part did not bear the mark by intermittently applying a pulsed dc voltage between the pair of electrodes 7a and 7b by the third power source 21 so as to intermittently exert an electric field in the first electric field direction A on the liquid crystal layer 6 before starting the application of a voltage to the electrodes.

Here, the mechanism of controlling occurrence of alignment defect of the liquid crystal molecules 6a is considered. The mechanism of white turbidity occurrence prevention through intermittently applying a pulsed dc voltage between the pair of electrodes 7a and 7b before starting the application of the voltage to the electrodes is not clear. However, the mechanism may be surmised as follows. That is, an electric field in the first electric field direction A is intermittently formed in the liquid crystal layer 6 by intermittently applying a pulsed dc voltage between the pair of electrodes 7a and 7b. It is surmised that, on this occasion, at the moment of ON/OFF of the pulsed dc voltage, the orientation of the liquid crystal molecules 6a in the liquid crystal layer 6 is disturbed in a wave manner from the vicinities of the electrodes 7a and 7b, and the disturbance is propagated to the adjacent liquid crystal molecules 6a. Thus, the liquid crystal molecules 6a are intermittently oscillated throughout the entire liquid crystal layer 6. This oscillation temporarily disturbs the orientation state of the liquid crystal molecules 6a in the entire liquid crystal layer 6. Hence, even when the orientation state of the liquid crystal molecules 6a is regionally disturbed in the liquid crystal layer 6, the mark borne in the interface of a part where the orientation state is disturbed and a part where the orientation state is not disturbed is eliminated. The liquid crystal molecules 6a possess the property of spontaneously reorienting themselves when the orientation state is disturbed. Accordingly, it is surmised that the liquid crystal molecules 6a may be oriented substantially perpendicularly throughout the liquid crystal layer 6 by temporarily disturbing the orientation state of the liquid crystal molecules 6a in the entire liquid crystal layer 6 so as to cause the liquid crystal molecules 6a throughout the liquid crystal layer 6 to effectively perform spontaneous reorientation.

It should be noted that such an effect is small if a dc voltage is continuously applied for a long time, or an ac voltage of a frequency on the order of the deflection frequency is applied. This also supports the importance of the wave-like movement that the disturbance of the orientation state occurring in switching the electric field direction propagates throughout the liquid crystal layer 6, after which reorientation is performed.

According to this embodiment, even when a local alignment defect occurs due to the optical deflection operation of the optical deflection element 5, generation of white turbidity caused by the occurrence of the alignment defect is controlled by preventing the alignment defect from being fixed. Thus, it is possible to provide the optical deflection device 20 having high reliability.

In addition, the third power source 21 applies a dc voltage of a voltage value that is set higher than the voltage value of the ac voltage applied by the first power source 8. For this reason, the liquid crystal molecules 6a in the liquid crystal layer 6 become more mobile at the moment of switching the electric field direction. Accordingly, it is possible to effectively prevent the interface part of the alignment defect part and a normal orientation part from bearing the mark, and to positively and uniformly reorient the liquid crystal molecules 6a in a shorter period of time.

Next, a description will be given of a tenth embodiment of the present invention. The present invention may be applied to, for example, the optical deflection device 30 shown in FIGS. 8A through 8C. Thus, in this embodiment, an example is shown where the present invention is applied to the optical deflection device 30 shown in FIGS. 8A through 8C.

The optical deflection device 30 of this embodiment includes: the first power source 8 that functions as the first voltage application means; the second power source 11 that applies between the pair of electrodes 7a and 7b an ac voltage of a higher frequency than the ac voltage of the driving frequency applied by the first power source 8 and functions as the second voltage application means; and the third power source 21 that intermittently applies a pulsed dc voltage between the pair of electrodes 7a and 7b and functions as the third voltage application means. The first power source 8 includes a function of varying the voltage value. The third power source 21 applies a dc voltage of a voltage value higher (greater) than the voltage value applied by the first power source 8. In addition, the second power source 11 includes a function of varying both the frequency and the ac voltage value. The first, second, and third power sources 8, 11, and 21, respectively, are switched by the switch 12 so that one of them is effective.

In such a construction, on the occasion of the optical deflection operation of the optical deflection device 30, an ac voltage of the driving frequency on the order of several hundred Hz is applied between the pair of electrodes 7a and 7b by the first power source 8. Thus, the optical deflection direction is switched with the switching timing of several hundred Hz so that an incident light on the liquid crystal layer 6 takes the light path of one of the first outgoing light a and the second outgoing light b (optical deflection step).

At this moment, an ac voltage of a higher frequency than the deflection frequency may be applied such that an ac voltage of a lower frequency than the deflection frequency is applied and thereafter the frequency of the ac voltage is increased continuously or in stages.

Additionally, at this moment, an ac voltage of a higher voltage value than the voltage value applied by the first power source 8 may be applied.

In this embodiment, when starting the optical deflection operation, prior to application of a voltage between the pair of electrodes 7a and 7b, a pulsed dc voltage is intermittently applied between the pair of electrodes 7a and 7b by the third power source 21 (orientation cancel step), an ac voltage of a higher frequency than the frequency in the deflection direction switching operation is applied between the pair of electrodes 7a and 7b by the second power source 11 (application start step), and thereafter an ac voltage of the deflection frequency is applied. Here, one of the functions of the start process means is realized.

According to this embodiment, it was confirmed that occurrence of white turbidity was controlled and the interface portion of a clouded part and a normal part did not bear the mark by, when starting the application of a voltage between the pair of electrodes 7a and 7b, before the application of an ac voltage of the deflection frequency, intermittently applying a pulsed dc voltage between the pair of electrodes 7a and 7b by the third power source 21, applying an ac voltage of a higher frequency than the frequency in the deflection direction switching operation between the pair of electrodes 7a and 7b by the second power source 11, and thereafter starting the application of the voltage to the electrodes 7a and 7b.

In the following, the mechanism of white turbidity occurrence prevention is considered. The mechanism of occurrence of white turbidity is not clear. However, as described above, by intermittently applying the pulsed dc voltage between the pair of electrodes 7a and 7b by the third power source 21 after applying the ac voltage of the deflection frequency by the first power source 8, the orientation of the liquid crystal molecules 6a in the entire liquid crystal layer 6 is disturbed, and thus the mark of the interface of the normal orientation part and the alignment defect part is eliminated. In this state, when the second power source 11 applies between the pair of electrodes 7a and 7b the ac voltage of the higher frequency than the driving frequency so as to apply the ac voltage having the shorter cycle than the electric field direction switching cycle in the optical deflection operation, the liquid crystal molecules 6a in the liquid crystal layer 6 are maintained to be comparatively mobile, while the response time does not adequately catch up with the switching of the electric field direction. Consequently, the liquid crystal molecules 6a are slightly oscillated near the perpendicular orientation state.

By the way, it relatively takes time for the liquid crystal molecules 6a of which orientation state is disturbed throughout the liquid crystal layer 6 to perfectly and spontaneously perform reorientation.

In this embodiment, after disturbing the orientation of the liquid crystal molecules 6a in the entire liquid crystal layer 6, the liquid crystal molecules 6a are slightly oscillated near the perpendicular orientation state while being maintained to be comparatively mobile. Hence, compared with the case where the reorientation operation of the liquid crystal molecules 6a is accelerated so as to cause the liquid crystal molecules 6a to perfectly and spontaneously perform reorientation, it is possible to positively cause the liquid crystal molecules 6a to perform reorientation in a short period of time.

Additionally, in this embodiment, the high frequency ac voltage is applied after the application of the pulsed dc voltage. Thus, the reorientation process thereafter of the entire liquid crystal layer 6 is accelerated. Hence, compared with the case where a high frequency ac voltage is applied without applying a pulsed dc voltage, it is possible to positively cause the liquid crystal molecules 6a to perform reorientation throughout the liquid crystal layer 6 in a short period of time.

By the way, in the above-described various embodiments, an ac voltage of a higher frequency than the deflection frequency may be applied such that an ac voltage of a lower frequency than the deflection frequency is applied by the second power source 11 and thereafter the frequency of the ac voltage is increased continuously or in stages. In this case, even if the liquid crystal molecule direction is disturbed by the influence of such as an external electric field and temperature variation while stopping the operation of the optical deflection element, after giving oscillation to the liquid crystal layer 6 with an ac voltage of a comparatively low frequency so as to make the liquid crystal layer 6 assume a state where the liquid crystal molecules 6a easily flow and the orientation state thereof is easily varied, by applying an ac voltage of a high frequency by increasing the frequency of the ac voltage of the comparatively low frequency continuously or in stages, it is possible to positively obtain the perpendicular orientation state.

In addition, an ac voltage of the deflection frequency may be applied through applying an ac voltage of a higher frequency than the deflection frequency by the second power source 11, and thereafter decreasing the frequency of this ac voltage continuously or in stages. In this case, even if the liquid crystal molecule direction is disturbed by the influence of such as an external electric field while stopping the operation of the optical deflection element, after bringing the liquid crystal molecule direction to the perpendicular state with a high frequency ac voltage, the deflection frequency is applied by decreasing the frequency of the high frequency ac voltage continuously or in stages. Hence, it is possible to prevent disturbance of the liquid crystal molecules that tends to occur in rapid frequency switching to the deflection frequency.

Further, in a case where an ac voltage of a higher voltage value than the voltage value applied by the first power source 8 is applied by the second power source 11, an electrostatic force exerted on the liquid crystal molecules 6a becomes great, and a force to orient the liquid crystal molecules 6a in the perpendicular direction becomes great. Hence, even if a part having a tendency to form white turbidity is generated since the orientation state is disturbed by the optical deflection operation of the optical deflection element, it is possible to quickly bring the liquid crystal molecules 6a to the original perpendicular orientation state.

Moreover, in a case where an ac voltage of a lower voltage value than the voltage value applied by the first power source 8 is applied by the second power source 11, and thereafter the voltage value of the ac voltage is increased continuously or in stages so as to apply the deflection operation voltage value, even if disturbance of the liquid crystal molecules 6a occurs while the operation of the optical deflection element is stopped, by applying at the beginning a voltage value lower than the voltage value of the saturation electric field capable of switching the liquid crystal molecules 6a, it is possible to cause the liquid crystal molecules 6a to switch at an angle nearer to perpendicular than the switching position of the optical deflection direction, and to make the liquid crystal molecules 6a closer to the angle of optical deflection direction continuously or in stages by increasing the applying voltage value continuously or in stages. Hence, it is possible to prevent disturbance of the liquid crystal molecules 6a due to rapid switching of the deflection frequency.

Next, a description will be given of an eleventh embodiment of the present invention. This embodiment is different from the above-described various embodiments in that the dielectric anisotropy of the liquid crystal layer 6 forming the chiral smectic C phase is negative in a frequency band of an ac voltage having a period of a half cycle shorter than the response time of the liquid crystal molecules 6a, and it is possible to perform the application start step described above.

According to this embodiment, for example, when an ac voltage is applied in a substantially parallel direction to the liquid crystal layer 6 of the optical deflection element 5 in the sixth embodiment, the liquid crystal molecules 6a of a liquid crystal material having positive dielectric anisotropy try to orient themselves in a direction parallel to the given electric field direction. Inversely, a liquid crystal material having negative dielectric anisotropy tries to orient itself in the direction perpendicular to the given electric field direction.

With such a construction, on the occasion of the optical deflection operation of the optical deflection device 1, an ac voltage of the driving frequency on the order of several hundred Hz is applied between the pair of electrodes 7a and 7b by the first power source 8. Thus, the optical deflection direction is switched with the switching timing of several hundred Hz so that an incident light on the liquid crystal layer 6 takes the light path of one of the first outgoing light a and the second outgoing light b (optical deflection step).

Since the liquid crystal layer 6 of this embodiment is made from a liquid crystal material having negative dielectric anisotropy, when a high frequency electric field is applied in a substantially parallel direction to the liquid crystal layer 6 on the occasion of the optical deflection operation so as to orient the liquid crystal molecules 6a such that electrostatic energy is minimized, as a result, the liquid crystal molecules 6a try to assume the perpendicular orientation state with respect to the layer direction of the liquid crystal layer 6. Hence, it is possible to positively orient the liquid crystal molecules 6a to assume the perpendicular orientation state when starting the optical deflection operation by exerting an electrostatic force in addition to the orientation control force of the orientation film 4.

In addition, it is possible to exert the electrostatic force in addition to the orientation control force of the orientation film 4 every time a voltage is applied between the pair of electrodes 7a and 7b. Accordingly, it is possible to control occurrence of alignment defect caused by the deflection direction switching operation, speed up the light path deflection operation of the optical deflection element 5 having a simplified construction, and control occurrence of alignment deflect due to repeated use, so as to improve reliability.

EXAMPLES

A description will be given of examples of the present invention. In the examples, three kinds of optical deflection elements A, B and C are prepared. As will be described in Examples 1 through 4 and Comparative Examples 1 and 2, the evaluations of variation in performance through repeated use are made by varying the application method of a voltage to the optical deflection elements A, B and C.

First, a surface of a glass board (the boards 2 and 3), having the size of 3 cm×4 cm with the thickness of 1 mm, was treated with a perpendicular orientation film JALS2021-R2 (manufactured by JSR Corporation) so as to form a perpendicular orientation film (the orientation film 4) on one side of the glass board. Two of such glass boards were bonded together with the perpendicular orientation films inside while interposing therebetween two aluminum electrode sheets (the electrodes 7a and 7b) as spacers, each of the aluminum electrode sheets having the thickness of 50 μm, the width of 1 mm, and the length of 3 cm. The two aluminum electrode sheets were parallel and the distance therebetween was set to 2 mm. Then, a ferroelectric liquid crystal (CS1029 manufactured by Chisso Corporation) was poured between the two bonded glass boards by a capillary method, cooled, and thereafter sealed with an adhesive agent. Thus, an optical deflection element A having the liquid crystal layer 6 was made.

In addition, as in the optical deflection element A, a surface of a glass board, having the size of 3 cm×4 cm with the thickness of 1 mm, was treated with the perpendicular orientation film JALS2021-R2 (manufactured by JSR Corporation) so as to form the perpendicular orientation film on one side of the glass board. Two of such glass boards were bonded together with the perpendicular orientation films inside while interposing therebetween two aluminum electrode sheets as spacers, each of the aluminum electrode sheets having the thickness of 30 μm, the width 1 mm, and the length 3 cm. The two aluminum electrode sheets were made parallel, and the distance therebetween was set to 2 mm. Then, a ferroelectric liquid crystal (FELIX-016/100 manufactured by Clariant (Japan) K.K.) having negative dielectric anisotropy was poured between the two glass boards by a capillary method, cooled, and thereafter sealed with an adhesive agent. Thus, an optical deflection element B having the liquid crystal layer 6 was made.

Further, instead of the ferroelectric liquid crystal having negative dielectric anisotropy of the optical deflection element B, a ferroelectric liquid crystal having positive dielectric anisotropy (FELIX-018/000) was poured by a capillary method, cooled, and thereafter sealed with an adhesive agent. Thus, an optical deflection element C was made.

In any of the optical deflection elements A, B and C, at the moment they were made, there was no white turbidity in the liquid crystal layer between the aluminum electrode sheets. Ascertaining the orientation state by a conoscope apparatus, the perpendicular orientation state was observed in all parts.

COMPARATIVE EXAMPLES

In Comparative Example 1, using the optical deflection element A, an ac voltage of ±200V and 100 Hz, which is similar to the pixel shift driving, was applied for 40 minutes. Thereafter, the orientation state of the liquid crystal was observed.

As a result, in Comparative Example 1, a slightly clouded part was developed in the vicinities of the electrodes.

Also, in Comparative Example 1, the clouded part in the vicinities of the electrodes was grown up by repeating the optical deflection operation where the same voltage of ±200V and 100 Hz, which is similar to the pixel shift driving, was applied for 40 minutes.

Example 1

In Example 1, using the optical deflection element A, the ac voltage of ±200 V and 100 Hz, which was similar to the pixel shift driving, was applied for 40 minutes in a similar manner. Thereafter, an ac voltage of +100 V and 1 kHz was applied for one minute before stopping the optical deflection operation. Then, the orientation state of the liquid crystal layer thereafter was observed.

As a result, in the Example 1, white turbidity was not developed in the vicinities of the electrodes. Although a similar optical deflection operation was repeated thereafter, white turbidity was not developed.

Example 2

In Example 2, using the optical deflection element A, the ac voltage of ±200 V and 100 Hz, which was similar to the pixel shift driving, was applied for 40 minutes in a similar manner. Then, a pulsed dc voltage of +200 V is applied ten times in one minute and stopped. Then, the orientation state of the liquid crystal thereafter was observed.

Consequently, in Example 2, white turbidity was not developed in the vicinities of the electrodes. Thereafter, though the similar optical deflection operation was repeated, white turbidity was not developed.

Example 3

In Example 3, using the optical deflection element A, the ac voltage of ±200 V and 100 Hz, which was similar to the pixel shift driving, was applied for 40 minutes in a similar manner. Then, a pulsed dc voltage of +200 V was applied five times in 30 seconds. Then, an ac voltage of ±100 V and 1 kHz was further applied for 30 seconds, and stopped. Then, the orientation state of the liquid crystal thereafter was observed.

As a result, in Example 3, white turbidity was not developed in the vicinities of the electrodes. Thereafter, though the similar optical deflection operation was repeated, white turbidity was still not developed.

Example 4

In Example 4, using the optical deflection element B, the ac voltage of ±200 V and 100 Hz, which was similar to the pixel shift driving, was applied for 40 minutes. Then, before stopping the optical deflection operation, an ac voltage of ±100 V and 1 kHz was applied for five seconds and stopped. Then, the orientation state of the liquid crystal thereafter was observed.

As a result, in Example 4, white turbidity was not developed in the vicinities of the electrodes. Thereafter, though the similar optical deflection operation was repeated, white turbidity was still not developed.

Comparative Example 2

In Comparative Example 2, the ac voltage of +200 V and 100 Hz, which was similar to the pixel shift driving, was applied for 40 minutes to the optical deflection element C. Then, before stopping the optical deflection operation, an ac voltage of ±100 V and 1 kHz was applied for five seconds and stopped. Then, the orientation state of the liquid crystal thereafter was observed.

As a result, in Comparative Example 2, white turbidity was slightly developed in the vicinities of the electrodes.

Example 5

As described above, an ac voltage of ±200 V and 100 Hz, which was similar to the pixel shift driving, was applied for 40 minutes to the optical deflection element A. Thereafter, the orientation state of the liquid crystal layer was observed. As a result, the vicinities of the electrodes were slightly clouded. Then, an ac voltage of ±100 V and 1 kHz was applied for five seconds, and thereafter the ac voltage of ±200 V and 100 Hz, which was similar to the pixel shift driving, was applied for one minute, and the orientation state of the liquid crystal layer was observed. Consequently, no white turbidity was found.

Comparative Example 3

The optical deflection element B was left for one month, and thereafter the orientation state of the liquid crystal layer was observed. As a result, white turbidity slightly occurred in the vicinities of the electrodes. Then, the ac voltage of +200 V and 100 Hz, which was similar to the pixel shift driving, was applied for 40 minutes. Consequently, the clouded part was somewhat enlarged.

Example 6

A pulsed dc voltage of +200 V was applied ten times in one minute to the element of Comparative Example 3. Thereafter, the ac voltage of ±200 V and 100 Hz, which was similar to the pixel shift driving, was applied for one minute, and the orientation state of the liquid crystal layer was observed. As a result, there was no white turbidity.

Example 7

The ac voltage of +200 V and 100 Hz, which was similar to the pixel shift driving, was applied to the optical deflection element B, and only the voltage value was varied and the application of voltage was stopped. The orientation state then was observed by a conoscope apparatus. Table 1 shows comparison of states of the liquid crystal layer brought to the perpendicular orientation state after stopping the application of voltage. Good perpendicular orientation states were obtained when the application of voltage was stopped at low voltages. The results are shown in Table 1.

TABLE 1

| voltage at stoppage of application | orientation state |
| --- | --- |
| 50 V | good |
| 100 V | good |
| 200 V | rather good |
| 300 V | rather good |
| 500 V | rather bad |

According to the optical deflection device of the present invention, an ac voltage of the deflection frequency is applied to a pair of electrodes so as to switch the electric field direction formed in the liquid crystal layer in a chiral smectic C phase. Thus, it is possible to speed up the light path shift operation by using spontaneous polarization of the liquid crystal in the chiral smectic C phase, even with an optical deflection element having a simplified construction. Also, before stopping application of the voltage, the electric field direction is switched with a shorter cycle than the switching cycle of the optical deflection direction. Thus, it is possible to accelerate reorientation of liquid crystal molecules in the direction determined by the spontaneous polarization and an external electric field, and to orient the liquid crystal molecules in a disturbed orientation state due to the optical deflection operation substantially perpendicularly with respect to the board. Accordingly, it is possible to control occurrence of alignment defect due to repeated use and provide an optical deflection device of high reliability.

In addition, according to the optical deflection device of the present invention, before stopping the application of the voltage, an ac voltage having a period of a half cycle shorter than the response time of the liquid crystal molecules is applied. Consequently, the response of the liquid crystal molecules to the switching time of the electric field direction is delayed. Thus, the actual switching operation is limited while maintaining the liquid crystal molecules to be mobile. Hence, the orientation control force in a substantially perpendicular direction is exerted on the liquid crystal molecules so as to accelerate reorientation of the liquid crystal molecules. Accordingly, it is possible to orient the liquid crystal molecules in a disturbed orientation state due to the optical deflection operation of the optical deflection element substantially perpendicularly with respect to the board in a short time.

Further, according to the optical deflection device of the present invention, when stopping the application of voltage to the electrodes, a voltage greater than the voltage that disturbs the orientation state of the liquid crystal molecules is applied. Hence, it is possible to positively orient the liquid crystal molecules in the disturbed orientation state due to the optical deflection operation of the optical deflection element substantially perpendicularly with respect to the board. Accordingly, it is possible to more positively control occurrence of alignment defect due to repeated use and provide an optical deflection device of higher reliability.

Additionally, according to the optical deflection device of the present invention, an ac voltage of the deflection frequency is applied to the pair of electrodes so as to switch the electric field direction formed in the liquid crystal layer in the chiral smectic C phase. Thus, it is possible to speed up the light path shift operation by using spontaneous polarization of the liquid crystal in the chiral smectic C phase, even with the optical deflection element having the simplified construction. Also, following the application of the ac voltage of the deflection frequency, the pulsed dc voltage is intermittently applied before stopping the application of the ac voltage of the deflection frequency so as to temporarily disturb the orientation state of the liquid crystal molecules throughout the liquid crystal layer. Thereafter, the ac voltage of the higher frequency than the deflection frequency is applied so as to form the electric field of which direction is switched with a shorter cycle than the switching cycle of the optical deflection direction. Accordingly, even when the orientation state of the liquid crystal molecules is partially disturbed due to the optical deflection operation of the optical deflection element, it is possible to eliminate the interface of the part where the orientation state is partially disturbed and a part where the orientation state is not disturbed, thereby causing the liquid crystal molecules to spontaneously reorient themselves throughout the liquid crystal layer. Accordingly, compared with the spontaneous reorientation process of the liquid crystal molecules, it is possible to uniformly orient, in a substantially perpendicular direction, the liquid crystal molecules in the entire liquid crystal layer with a shorter time.

In addition, according to the optical deflection device of the present invention, the ac voltage of the deflection frequency is applied to the pair of electrodes so as to switch the electric field direction formed in the liquid crystal layer in the chiral smectic C phase. Thus, it is possible to speed up the light path shift operation by using spontaneous polarization of the liquid crystal in the chiral smectic C phase, even with the optical deflection element having the simplified construction. Also, before stopping the application of the ac voltage of the deflection frequency, following the application of the ac voltage of the deflection frequency, the pulsed dc voltage is intermittently applied so as to temporarily disturb the orientation state of the liquid crystal molecules throughout the liquid crystal layer. Accordingly, even when the orientation state of the liquid crystal molecules is partially disturbed due to the optical deflection operation of the optical deflection element, it is possible to eliminate the interface of the part where the orientation state is partially disturbed and the part where the orientation state of the liquid crystal molecules is not disturbed, thereby causing the liquid crystal molecules to spontaneously reorient themselves throughout the liquid crystal layer. Accordingly, it is possible to control occurrence of alignment defect due to repeated use and uniformly orient the liquid crystal molecules in the entire liquid crystal layer.

Additionally, according to the optical deflection device of the present invention, it is possible to effectively disturb the orientation state of the liquid crystal molecules throughout the liquid crystal layer, and positively perform the reorientation process of the liquid crystal molecules in the entire liquid crystal layer. Consequently, it is possible to more positively make the orientation state of the liquid crystal molecules uniform in the entire liquid crystal layer.

Further, according to the optical deflection device of the present invention, the dielectric anisotropy of the liquid crystal layer forming the chiral smectic C phase may be negative in a frequency band of an ac voltage having a period of a half cycle shorter than the response time of the liquid crystal molecules. Thus, when a high frequency electric field is applied in a substantially parallel direction with respect to the liquid crystal layer by applying the voltage to the electrodes, the liquid crystal molecules attempt to assume the orientation state in a substantially perpendicular direction with respect to the liquid crystal layer so that the electrostatic energy is minimized. Accordingly, it is possible to exert an electrostatic force in addition to the orientation control force of the orientation film so as to control occurrence of alignment defect due to repeated use. Thus, it is possible to positively cause the liquid crystal molecules to assume the substantially perpendicular orientation state.

In addition, according to the optical deflection device of the present invention, the electric field direction formed in the liquid crystal layer in the chiral smectic C phase is switched by applying the ac voltage of the deflection frequency to the pair of electrodes. Hence, even with an optical deflection element having a simplified construction, it is possible to speed up the light path shift operation by using spontaneous polarization of liquid crystal in the chiral smectic C phase. Also, when starting application of voltage, by decreasing continuously or in stages the voltage value of the applying ac voltage of the deflection frequency, and stopping the application at a voltage value lower than the voltage value capable of switching the optical deflection direction, as the applied voltage value becomes smaller than the voltage value for the saturation electric field switching the liquid crystal molecules, it is possible to stop the application near a state where the liquid crystal molecules are brought to the perpendicular state. Accordingly, without varying the deflection frequency, it is possible to prevent disturbance of the liquid crystal molecules that occurs in stopping the optical deflection operation. Thus, it is possible to provide a reliable optical deflection device having a simple construction.

Additionally, according to the optical deflection device of the present invention, the direction of an electric field formed in the liquid crystal layer is switched by applying the ac voltage of the deflection frequency to the pair of electrodes. Hence, even with an optical deflection element having a simplified construction, it is possible to speed up the light path shift operation by using spontaneous polarization of liquid crystals in the chiral smectic C phase. Also, when starting the application of voltage, an electric field switching with a shorter cycle than the switching cycle of the optical deflection direction is formed in the liquid crystal layer through applying an ac voltage of a higher frequency than the deflection frequency and thereafter applying the ac voltage of the deflection frequency. With this high frequency electric field, it is possible to exert a force to orient the liquid crystal molecules in the perpendicular direction on the liquid crystal molecules in the vicinity of the intermediate layer of the liquid crystal layer, and to bring, to the perpendicular orientation state, the liquid crystal molecules in a part having a tendency to form white turbidity since the orientation direction is disturbed while stopping the operation of the element. Hence, it is possible to prevent generation of a clouded part caused when disturbance of the orientation state is fixed.

Additionally, according to the optical deflection device of the present invention, even in a case where the directions of the liquid crystal molecules are disturbed by influence of such as an external electric field and temperature variation while stopping the operation of the optical deflection element, by giving oscillation to the liquid crystal layer by the ac voltage of a comparatively low frequency so as to make the liquid crystal layer easily flow and change the orientation state, and thereafter increasing the frequency continuously or in stages so as to apply the ac voltage of a high frequency, it is possible to bring the liquid crystal molecules to the perpendicular orientation state without disturbing the orientation state in switching the frequency.

In addition, according to the optical deflection device of the present invention, even in a case where the directions of the liquid crystal molecules are disturbed by influence of such as an external electric field while stopping the operation of the optical deflection element, by bringing the liquid crystal molecules to the perpendicular state with the ac voltage of a high frequency, and thereafter decreasing the frequency continuously or in stages so as to apply the deflection frequency, it is possible to bring the liquid crystal molecules to the perpendicular orientation state before starting the optical deflection operation within a short period of time and without disturbing the orientation state in switching the frequency. Hence, it is possible to prevent disturbance of the liquid crystal molecules that tends to occur when rapidly switching the frequency.

Additionally, according to the optical deflection device of the present invention, the response of the liquid crystal molecules is delayed with respect to the switching time of the electric field direction caused by applying the ac voltage by the second voltage application part. Consequently, the liquid crystal molecules are less slightly oscillated than in the original switching operation. Hence, even if there is a part having a tendency to develop white turbidity due to disarrangement of the orientation directions of the liquid crystal molecules, it is possible to exert a force orienting the liquid crystal molecules in the part in the perpendicular direction, and to quickly bring the liquid crystal molecules to the original perpendicular orientation state since the liquid crystal molecules are kept mobile by the slight oscillation. Accordingly, it is possible to positively bring the liquid crystal molecules to the perpendicular orientation state within a shorter period of time before starting the optical deflection operation.

In addition, according to the optical deflection device of the present invention, it is possible to increase an electrostatic force exerted on the liquid crystal molecules and to increase a force to orient the liquid crystal molecules in the perpendicular direction. Thus, even if a part having a tendency to form white turbidity is generated since the orientation state is disturbed by the optical deflection operation of the optical deflection element, it is possible to more positively and quickly bring the liquid crystal molecules to the perpendicular orientation state, before starting the optical deflection operation and without disturbing the orientation state in switching the frequency.

Additionally, according to the optical deflection device of the present invention, even if disturbance of the liquid crystal molecules occurs while stopping the operation of the optical deflection element, it is possible to make the liquid crystal molecules switch at an angle closer to perpendicular than the switching position of the optical deflection direction by applying a voltage value lower than the voltage value for the saturation electric field of switching the liquid crystal molecules at the beginning. Also, by increasing the successively applied voltage value continuously or in stages, it is possible to make the liquid crystal molecules move closer to the angle of the optical deflection direction continuously or in stages. Accordingly, it is possible to prevent disturbance of the orientation state of the liquid crystal molecules due to rapid switching to the deflection frequency.

Further, according to the optical deflection device of the present invention, it is possible to eliminate the interface portion of the clouded part and the normal part by intermittently applying the pulsed dc voltage so as to greatly disturb the orientation of the entire liquid crystal layer and to temporarily make the entire liquid crystal layer assume a state where white turbidity is easily formed. Thereafter, by applying a high frequency electric field, the entire liquid crystal layer can be brought to the uniform perpendicular orientation state. Accordingly, it is possible to prevent the interface portion of the clouded part and the normal part from bearing the mark.

In addition, according to the optical deflection device of the present invention, by switching the direction of an electric field formed in the liquid crystal layer by applying the ac voltage of the deflection frequency to the pair of electrodes, even with an optical deflection element having a simplified construction, it is possible to speed up the light path shift operation by using spontaneous polarization of liquid crystal in the chiral smectic C phase. Also, by intermittently applying the pulsed dc voltage by the third voltage application means so as to temporarily disturb the orientation state of the liquid crystal molecules throughout the liquid crystal layer, and thereafter applying the ac voltage of the deflection frequency, it is possible to bring the liquid crystal molecules to the perpendicular orientation state before starting the optical deflection operation within a shorter period of time. Moreover, even if there is white turbidity before starting the optical deflection operation, by applying the pulsed dc voltage, it is possible to prevent the interface portion of the clouded part and the normal part from bearing the mark.

Further, according to the optical deflection device of the present invention, it is possible to temporarily disturb the orientation state of the liquid crystal molecules throughout the liquid crystal layer more effectively by applying a high voltage. Hence, it is possible to effectively disturb and eliminate the mark of the interface portion of the clouded part and the normal part.

Additionally, according to the optical deflection device of the present invention, the dielectric anisotropy of the liquid crystal layer forming the chiral smectic C phase may be negative. Thus, when a high frequency electric field is formed in a substantially parallel direction with respect to the liquid crystal layer by applying a voltage to the electrodes, the liquid crystal molecules try to orient themselves in a substantially perpendicular direction with respect to the liquid crystal layer so that the electrostatic energy is minimized. Hence, it is possible to control occurrence of alignment defect due to repeated use and to make the liquid crystal molecules assume the substantially perpendicular orientation state by exerting an electrostatic orientation force on the intermediate part of the liquid crystal layer in addition to the orientation control force in the vicinity of the board by the orientation film.

Also, according to the optical deflection method of the present invention, the ac voltage of the deflection frequency is applied to the pair of electrodes so as to switch the direction of an electric field formed in the liquid crystal layer in the chiral smectic C phase. Thus, it is possible to speed up the light path shift operation by using spontaneous polarization of the liquid crystal in the chiral smectic C phase, even with the optical deflection element having the simplified construction. Also, before stopping application of the ac voltage of the deflection frequency, the electric field direction is switched with a shorter cycle than the switching cycle of the optical deflection direction. Thus, it is possible to accelerate reorientation of liquid crystal molecules in the direction determined by spontaneous polarization and an external electric field, and to orient the liquid crystal molecules in a disturbed orientation state due to the optical deflection operation substantially perpendicularly with respect to the board. Accordingly, it is possible to control occurrence of alignment defect due to repeated use and provide an optical deflection device of high reliability.

In addition, according to the optical deflection method of the present invention, the ac voltage of the deflection frequency is applied to the pair of electrodes so as to switch the direction of an electric field formed in the liquid crystal layer in the chiral smectic C phase. Thus, it is possible to speed up the light path shift operation by using spontaneous polarization of the liquid crystal in the chiral smectic C phase, even with the optical deflection element having the simplified construction. Also, before stopping the application of the ac voltage of the deflection frequency, following the application of the ac voltage of the deflection frequency, the pulsed dc voltage is intermittently applied so as to temporarily disturb the orientation state of the liquid crystal molecules throughout the liquid crystal layer. Accordingly, even when the orientation state of the liquid crystal molecules is partially disturbed due to the optical deflection operation of the optical deflection element, it is possible to eliminate the interface of the part where the orientation state is partially disturbed and the part where the orientation state of the liquid crystal molecules is not disturbed, thereby causing the liquid crystal molecules to spontaneously reorient themselves throughout the liquid crystal layer. Accordingly, it is possible to control occurrence of alignment defect due to repeated use and uniformly orient the liquid crystal molecules in the entire liquid crystal layer.

Further, according to the optical deflection method of the present invention, the ac voltage of the deflection frequency is applied to the pair of electrodes so as to switch the electric field direction formed in the liquid crystal layer in the chiral smectic C phase. Thus, it is possible to speed up the light path shift operation by using spontaneous polarization of the liquid crystal in the chiral smectic C phase, even with the optical deflection element having the simplified construction. Also, following the application of the ac voltage of the deflection frequency, the pulsed dc voltage is intermittently applied before stopping the application of the ac voltage of the deflection frequency so as to temporarily disturb the orientation state of the liquid crystal molecules throughout the liquid crystal layer. Thereafter, the ac voltage of the higher frequency than the deflection frequency is applied so as to form the electric field of which direction is switched with a shorter cycle than the switching cycle of the optical deflection direction. Accordingly, even when the orientation state of the liquid crystal molecules is partially disturbed due to the optical deflection operation of the optical deflection element, it is possible to eliminate the interface of the part where the orientation state is partially disturbed and a part where the orientation state is not disturbed, thereby causing the liquid crystal molecules to spontaneously reorient themselves throughout the liquid crystal layer. Accordingly, compared with the spontaneous reorientation process of the liquid crystal molecules, it is possible to uniformly orient, in a substantially perpendicular direction, the liquid crystal molecules in the entire liquid crystal layer within a shorter period of time.

Additionally, according to the optical deflection method of the present invention, the direction of an electric field formed in the liquid crystal layer in the chiral smectic C phase is switched by applying the ac voltage of the deflection frequency to the pair of electrodes. Hence, even with an optical deflection element having a simplified construction, it is possible to speed up the light path shift operation by using spontaneous polarization of liquid crystal in the chiral smectic C phase. Also, when starting the application of voltage, the voltage value of the applied ac voltage of the deflection frequency is decreased continuously or in stages, and the application is stopped at a voltage value lower than the voltage value capable of switching the optical deflection direction. Hence, as the applied voltage value becomes smaller than the voltage for the saturation electric field switching the liquid crystal molecules, it is possible to stop the application near a state where the liquid crystal molecules are brought to the perpendicular state. Accordingly, without varying the deflection frequency, it is possible to prevent disturbance of the liquid crystal molecules that occurs in stopping the optical deflection operation. Thus, it is possible to provide a reliable optical deflection method.

In addition, according to the optical deflection method of the present invention, the direction of an electric field formed in the liquid crystal layer in the chiral smectic C phase is switched by applying the ac voltage of the deflection frequency to the pair of electrodes. Hence, even with an optical deflection element having a simplified construction, it is possible to speed up the light path shift operation by using spontaneous polarization of liquid crystal in the chiral smectic C phase. Also, when starting the application of voltage, before applying the ac voltage of the deflection frequency, an ac voltage of a higher frequency than the deflection frequency is applied so as to form, in the liquid crystal layer, an electric field switching with a shorter cycle than the switching cycle of the optical deflection direction. Hence, it is possible to exert a force to orient in the perpendicular direction on the liquid crystal molecules in the vicinity of the intermediate layer of the liquid crystal layer, and thereby bringing, to the perpendicular orientation state, a part having a tendency to form white turbidity since the orientation directions are disarranged. Accordingly, even if white turbidity is generated while stopping (suspending) the optical deflection operation, it is possible to bring the liquid crystal molecules to the perpendicular orientation state before starting the operation. Thus, it is possible to provide a reliable optical deflection method.

Further, according to the optical deflection method of the present invention, the direction of an electric field formed in the liquid crystal layer in the chiral smectic C phase is switched by applying the ac voltage of the deflection frequency to the pair of electrodes. Hence, even with an optical deflection element having a simplified construction, it is possible to speed up the light path shift operation by using spontaneous polarization of liquid crystal in the chiral smectic C phase. Also, when starting the application of voltage, the orientation state of the liquid crystal molecules is temporarily disturbed throughout the liquid crystal layer by intermittently applying the pulsed dc voltage, and thereafter the ac voltage of the deflection frequency is applied. Hence, it is possible to arrange the liquid crystal molecules in the optical deflection direction. Accordingly, even if white turbidity is generated while stopping (suspending) the optical deflection operation, when starting the application of voltage, it is possible to eliminate the interface portion of the normal part and the part where the orientation of the liquid crystal layer is disturbed. Thus, it is possible to provide a more reliable optical deflection method.

Additionally, according to the optical deflection method of the present invention, the direction of an electric field formed in the liquid crystal layer in the chiral smectic C phase is switched by applying the ac voltage of the deflection frequency to the pair of electrodes. Hence, even with an optical deflection element having a simplified construction, it is possible to speed up the light path shift operation by using spontaneous polarization of liquid crystal in the chiral smectic C phase. Also, when starting the application of voltage, before applying the ac voltage of the deflection frequency, the orientation state of the liquid crystal molecules is temporarily disturbed throughout the liquid crystal layer by intermittently applying the pulsed dc voltage, and thereafter the ac voltage of the higher frequency than the deflection frequency is applied. Hence, it is possible to make the entire liquid crystal layer assume the uniform orientation state within a shorter period of time. Moreover, even if white turbidity is generated while stopping (suspending) the optical deflection operation, it is possible to prevent the interface portion of the normal part and the part where the orientation of the liquid crystal layer is disturbed from bearing the mark. Accordingly, it is possible provide a reliable optical deflection method.

The present invention is not limited to the specifically disclosed embodiments, and variations and modifications may be made without departing from the scope of the present invention.

The present application is based on Japanese priority applications No. 2002-153978 filed on May 28, 2002 and No. 2003-101049 filed on Apr. 4, 2003, the entire contents of which are hereby incorporated by reference.

What is claimed is:

1. An optical deflection device, comprising:
   an optical deflection element comprising a liquid crystal layer filled between a pair of substrates, and electrodes forming an electric field in a direction substantially parallel to said liquid crystal layer;
   a first voltage application part configured to apply an ac voltage to said electrodes with a frequency switching an optical deflection direction of said optical deflection element; and
   a second voltage application part configured to apply a pulsed dc voltage to said electrodes,
   said second voltage application part configured to induce spontaneous reorientation of liquid crystal molecules in said liquid crystal layer by causing a disturbance of orientation of liquid crystal molecules over an entirety of said liquid crystal layer by applying said pulsed dc voltage across said electrodes.

2. An optical deflection device, comprising:
   an optical deflection element comprising a liquid crystal layer filled between a pair of substrates, said liquid crystal layer forming a chiral smectic C phase, and electrodes configured to generate an electric field in a substantially parallel direction with respect to said liquid crystal layer;
   a first voltage application part configured to apply, to said electrodes, an ac voltage of a frequency switching an optical deflection direction of said optical deflection element;
   a second voltage application part configured to intermittently apply a pulsed dc voltage to said electrodes; and
   a part causing said second voltage application part to intermittently apply the pulsed dc voltage after causing said first voltage application part to apply the ac voltage of the frequency, when stopping an operation of switching the optical deflection direction of said optical deflection element,
   said second voltage application part configured to induce spontaneous reorientation of liquid crystal molecules in said liquid crystal layer by causing a disturbance of orientation of liquid crystal molecules over an entirety of said liquid crystal layer by applying said pulsed dc voltage across said electrodes.

3. The optical deflection device as claimed in claim 2, wherein the second voltage application part is configured to apply the dc voltage at a higher voltage value than a voltage value applied by the first voltage application part.

4. The optical deflection device as claimed in claim 2, wherein a dielectric anisotropy of the liquid crystal layer forming the chiral smectic C phase is negative in a frequency band of an ac voltage having a period of a half cycle shorter than a response time of the liquid crystal molecules.

5. An optical deflection device, comprising:
   an optical deflection element comprising a liquid crystal layer filled between a pair of substrates, said liquid crystal layer forming a chiral smectic C phase, and electrodes configured to generate an electric field in a substantially parallel direction with respect to said liquid crystal layer;
   a voltage application part configured to apply, to said electrodes, an ac voltage of a frequency switching an optical deflection direction of said optical deflection element by varying a voltage value of the ac voltage; and
   a part configured to decrease the voltage value of the ac voltage of the frequency applied by said voltage application part continuously or in stages and configured to stop the application at a voltage value lower than a voltage value capable of switching the optical deflection direction, when stopping an operation of switching the optical deflection direction of said optical deflection element.

6. An optical deflection device, comprising:
   an optical deflection element comprising a liquid crystal layer filled between a pair of substrates, said liquid crystal layer forming a chiral smectic C phase, and electrodes configured to generate an electric field in a substantially parallel direction with respect to said liquid crystal layer;
   a first voltage application part configured to apply, to said electrodes, an ac voltage of a frequency switching an optical deflection direction of said optical deflection element;
   a second voltage application part configured to intermittently apply a pulsed dc voltage to said electrodes before application of the ac voltage; and
   a part configured to cause said second voltage application part to intermittently apply the pulsed dc voltage and thereafter configured to cause said first voltage application part to apply the ac voltage of the frequency, when starting an operation of switching the optical deflection direction of said optical deflection element,
   said second voltage application part configured to induce spontaneous reorientation of liquid crystal molecules in said liquid crystal layer by causing a disturbance of orientation of liquid crystal molecules over an entirety of said liquid crystal layer by applying said pulsed dc voltage across said electrodes.

7. The optical deflection device as claimed in claim 6, wherein the second voltage application part is configured to apply the dc voltage at a higher voltage value than a voltage value applied by the first voltage application part.

8. The optical deflection device as claimed in claim 6, wherein a dielectric anisotropy of the liquid crystal layer forming the chiral smectic C phase is negative in a frequency band of the ac voltage having a period of a half cycle shorter than a response time of the liquid crystal molecules.

9. An optical deflection method, comprising:
a first voltage application step of applying, to electrodes, an ac voltage of a frequency switching an optical deflection direction of an optical deflection element, said optical deflection element comprising a liquid crystal layer filled between a pair of substrates, said liquid crystal layer forming a chiral smectic C phase, said electrodes generating an electric field in a substantially parallel direction with respect to said liquid crystal layer; and
a second voltage application step of intermittently applying a pulsed dc voltage to said electrodes, following said first voltage application step, when stopping an operation of switching the optical deflection direction of said optical deflection element,
said second voltage application step inducing spontaneous reorientation of liquid crystal molecules in said liquid crystal layer by causing a disturbance of orientation of liquid crystal molecules over an entirety of said liquid crystal layer by applying said pulsed dc voltage across said electrodes.

10. An optical deflection method, comprising:
a first voltage application step of applying, to electrodes, an ac voltage of a first frequency switching an optical deflection direction of an optical deflection element, said optical deflection element comprising a liquid crystal layer filled between a pair of substrates, said liquid crystal layer forming a chiral smectic C phase, said electrodes generating an electric field in a substantially parallel direction with respect to said liquid crystal layer;
a second voltage application step of intermittently applying a pulsed dc voltage to said electrodes, following said first voltage application step, when stopping an operation of switching the optical deflection direction of said optical deflection element; and
a third voltage application step of applying, to said electrodes, an ac voltage of a second frequency higher than the first frequency, following said second voltage application step,
said second voltage application step inducing spontaneous reorientation of liquid crystal molecules in said liquid crystal layer by causing a disturbance of orientation of liquid crystal molecules over an entirety of said liquid crystal layer by applying said pulsed dc voltage across said electrodes.

11. An optical deflection method, comprising:
a first voltage application step of applying, to electrodes, an ac voltage of a frequency switching an optical deflection direction of an optical deflection element by varying a voltage value of the ac voltage, said optical deflection element comprising a liquid crystal layer filled between a pair of substrates, said liquid crystal layer forming a chiral smectic C phase, said electrodes generating an electric field in a substantially parallel direction with respect to said liquid crystal layer; and
a second voltage application step of decreasing, when stopping an operation of switching the optical deflection of said optical deflection element, continuously or in stages a voltage value of the ac voltage of the frequency applied in the first voltage application step, following said first voltage application step, so as to stop the application at a voltage value lower than a voltage value capable of switching the optical deflection direction.

12. An optical deflection method, comprising:
a first voltage application step of applying, to electrodes, an ac voltage of a frequency switching an optical deflection direction of an optical deflection element, said optical deflection element comprising a liquid crystal layer filled between a pair of substrates, said liquid crystal layer forming a chiral smectic C phase, said electrodes generating an electric field in a substantially parallel direction with respect to said liquid crystal layer; and
a second voltage application step of intermittently applying a pulsed dc voltage before said first voltage application step,
said second voltage application step inducing spontaneous reorientation of liquid crystal molecules in said liquid crystal layer by causing a disturbance of orientation of liquid crystal molecules over an entirety of said liquid crystal layer by applying said pulsed dc voltage across said electrodes.

13. An optical deflection method, comprising:
a first voltage application step of applying, to electrodes, an ac voltage of a first frequency switching an optical deflection direction of an optical deflection element, said optical deflection element comprising a liquid crystal layer filled between a pair of substrates, said liquid crystal layer forming a chiral smectic C phase, said electrodes generating an electric field in a substantially parallel direction with respect to said liquid crystal layer;
a second voltage application step of intermittently applying a pulsed dc voltage to said electrodes before said first voltage application step; and
a third voltage application step of applying an ac voltage of a second frequency higher than the first frequency, following said second voltage application step,
said second voltage application step inducing spontaneous reorientation of liquid crystal molecules in said liquid crystal layer by causing a disturbance of orientation of liquid crystal molecules over an entirety of said liquid crystal layer by applying said pulsed dc voltage across said electrodes.

* * * * *